USO11688030B2

(12) United States Patent
Chatterjee et al.

(10) Patent No.: US 11,688,030 B2
(45) Date of Patent: Jun. 27, 2023

(54) SHADING TOPOGRAPHY IMAGING FOR ROBOTIC UNLOADING

(71) Applicants: FRITO-LAY NORTH AMERICA, INC., Plano, TX (US); Graftek Imaging Inc., Austin, TX (US)

(72) Inventors: Romik Chatterjee, Austin, TX (US); Thomas M. Sterritt, Frisco, TX (US); Evan N. Sanford, The Colony, TX (US); Clark A. Turpin, Perry, GA (US); Robert Eastlund, Austin, TX (US); Christopher Koci, Austin, TX (US); Nicholas Conrad, Austin, TX (US); Vincent Ip, Austin, TX (US); Sih Ying Wu, Austin, TX (US)

(73) Assignees: Frito-Lay North America, Inc., Plano, TX (US); Graftek Imaging Inc., Austin, TX (US)

( * ) Notice: Subject to any disclaimer, the term of this patent is extended or adjusted under 35 U.S.C. 154(b) by 388 days.

(21) Appl. No.: 16/898,903

(22) Filed: Jun. 11, 2020

(65) Prior Publication Data
US 2020/0394747 A1 Dec. 17, 2020

Related U.S. Application Data

(60) Provisional application No. 62/860,307, filed on Jun. 12, 2019.

(51) Int. Cl.
B25J 9/16 (2006.01)
G06T 1/00 (2006.01)
(Continued)

(52) U.S. Cl.
CPC ............. *G06T 1/0014* (2013.01); *B25J 9/161* (2013.01); *B25J 9/1697* (2013.01); *B25J 13/08* (2013.01);
(Continued)

(58) Field of Classification Search
CPC .................... G06T 1/0014; G06T 7/70; G06T 2207/10152; B25J 9/161; B25J 9/1697;
(Continued)

(56) References Cited

U.S. PATENT DOCUMENTS 5,383,013 A 1/1995 Cox
6,614,928 B1 * 9/2003 Chung .................... G06T 17/10
356/627

(Continued)

OTHER PUBLICATIONS

Agrawal, Amit, et al. "Vision-Guided Robot System for Picking Objects by Casting Shadows". 2010, Sage Journal, The International Journal of Robotics Research, vol. 29, No. 2-3, Feb. 2010, pp. 155-173, doi:10.1177/0278364909353955. (Year: 2010).*

(Continued)

*Primary Examiner* — Jaime Figueroa
(74) *Attorney, Agent, or Firm* — Barnes & Thornburg LLP; Steven D. Shipe

(57) ABSTRACT

Vision systems for robotic assemblies for handling cargo, for example, unloading cargo from a trailer, can determine the position of cargo based on shading topography. Shading topography imaging can be performed by using light sources arranged at different positions relative to the image capture device(s).

21 Claims, 17 Drawing Sheets
(1 of 17 Drawing Sheet(s) Filed in Color)

(51) Int. Cl.
  *B25J 13/08* (2006.01)
  *B65G 67/24* (2006.01)
  *G06T 7/70* (2017.01)

(52) U.S. Cl.
  CPC .............. *B65G 67/24* (2013.01); *G06T 7/70* (2017.01); *G06T 2207/10152* (2013.01)

(58) Field of Classification Search
  CPC .................. B25J 13/08; B65G 67/24; G05B 2219/37556; G05B 2219/40006; G05B 2219/40532; G05B 2219/40564; G05B 2219/45056
  USPC ........ 700/259, 245–264; 318/568.11–568.25
  See application file for complete search history.

(56) References Cited

U.S. PATENT DOCUMENTS

| | | | |
|---|---|---|---|
| 6,944,324 B2 * | 9/2005 | Tran | G06T 7/44 382/101 |
| 7,039,229 B2 | 5/2006 | Lin et al. | |
| 7,313,464 B1 | 12/2007 | Perreault et al. | |
| 7,444,013 B2 | 10/2008 | Chen | |
| 7,623,687 B2 | 11/2009 | Bronstein et al. | |
| 9,014,848 B2 | 4/2015 | Farlow et al. | |
| 9,533,841 B1 | 1/2017 | Criswell | |
| 9,630,320 B1 * | 4/2017 | Konolige | G06T 17/00 |
| 9,694,498 B2 * | 7/2017 | Konolige | G01B 11/24 |
| 9,738,463 B2 * | 8/2017 | Wicks | B25J 15/0616 |
| 9,744,669 B2 * | 8/2017 | Wicks | B25J 9/1664 |
| 9,912,862 B2 * | 3/2018 | Peruch | G01B 11/2545 |
| 10,007,892 B1 * | 6/2018 | Hahn | G01G 7/06 |
| 10,124,967 B2 | 11/2018 | Girtman et al. | |
| 10,147,210 B1 * | 12/2018 | Desai | H04N 7/183 |
| 10,466,043 B2 * | 11/2019 | Konolige | H04N 13/254 |
| 10,625,432 B2 * | 4/2020 | Wagner | B25J 9/1697 |
| 11,263,795 B1 * | 3/2022 | Desai | G06F 3/0425 |
| 2007/0140821 A1 * | 6/2007 | Garon | B25J 9/0084 414/730 |
| 2013/0108408 A1 * | 5/2013 | Saison | B65H 3/46 414/797 |
| 2015/0352721 A1 * | 12/2015 | Wicks | B25J 9/1687 700/228 |
| 2015/0360882 A1 | 12/2015 | Girtman | |
| 2016/0063309 A1 * | 3/2016 | Konolige | G06T 1/0014 901/14 |
| 2016/0068357 A1 | 3/2016 | Bastian, II | |
| 2016/0288330 A1 * | 10/2016 | Konolige | G06T 1/0014 |
| 2017/0073175 A1 * | 3/2017 | Wicks | B25J 15/0052 |
| 2017/0136632 A1 * | 5/2017 | Wagner | B07C 3/18 |
| 2017/0251143 A1 * | 8/2017 | Peruch | H04N 5/23293 |
| 2017/0261314 A1 * | 9/2017 | Konolige | H04N 13/271 |
| 2018/0111769 A1 * | 4/2018 | Yuvaraj | B25J 9/1687 |
| 2020/0164531 A1 * | 5/2020 | Wagner | G05B 19/4183 |

OTHER PUBLICATIONS

Rasoul Mojtahedzadeh, Safe Robotic Manipulation to Extract Objects from Piles: From 3D Perception to Object Selection, 2016, Orebro University Sweden, Orebro Studies in Technology 71, ISSN 1650-8580, ISBN 978-91-7529-152-9, pp. 1-126 (Year: 2016).*

* cited by examiner

| COMPONENT | MEASUREMENT | VALUE (LINEAR DIMENSION IN INCHES, ANGULAR DIMENSIONS IN DEGREES) |
|---|---|---|
| CAMERA MODULE | WORKING DISTANCE TO PRODUCT WALL | 53.5 |
| | SYSTEM TILT RANGE (RAMP OPERATION) | 5 |
| UPPER LIGHT BAR | LIGHTING HEIGHT FROM FLOOR | 90.75 |
| | LIGHTING DISTANCE TO PRODUCT WALL | 52.5 |
| | LIGHTING ANGLE | 60 |
| LOWER LIGHT BAR | LIGHTING HEIGHT FROM FLOOR | 21.25 |
| | LIGHTING DISTANCE TO PRODUCT WALL | 50.25 |
| | LIGHTING ANGLE | 60 |

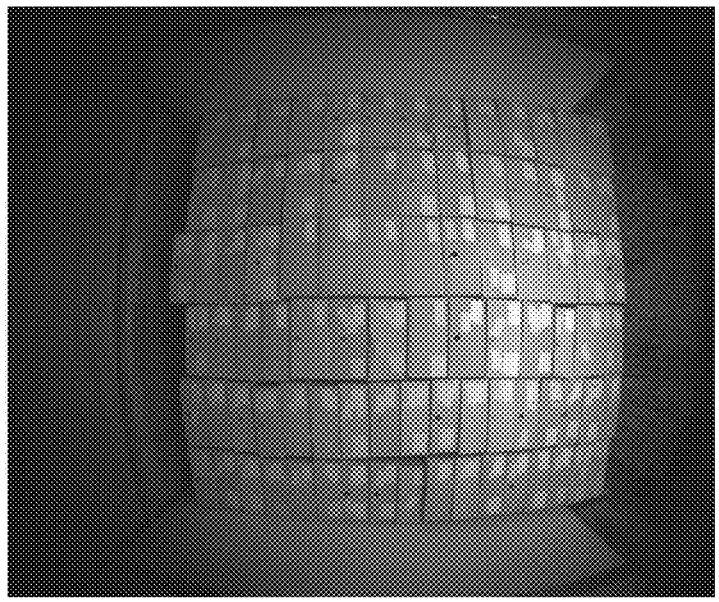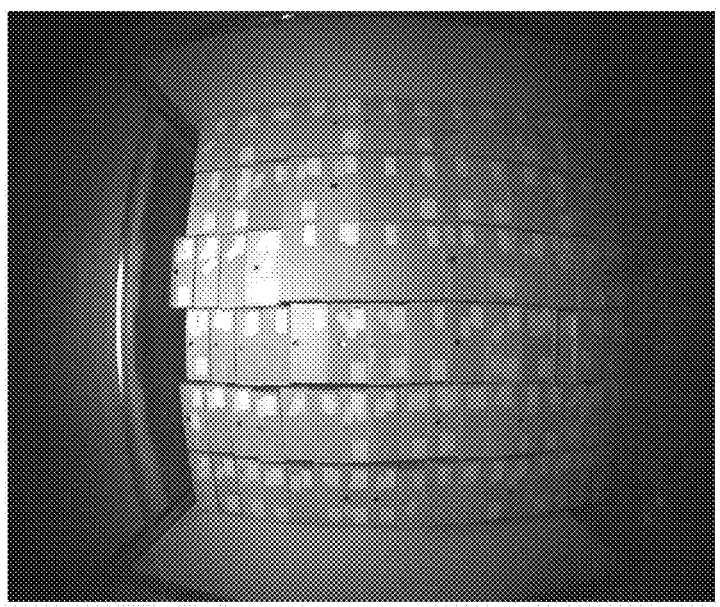
FIG. 11

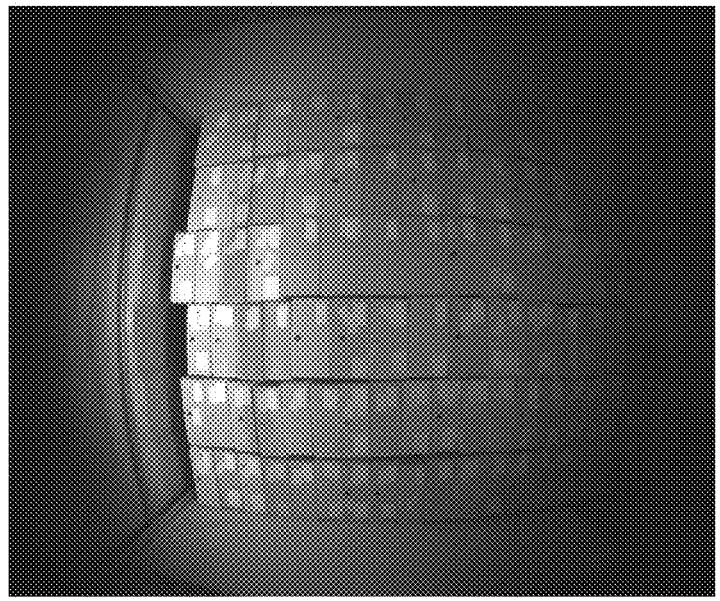
FIG. 12

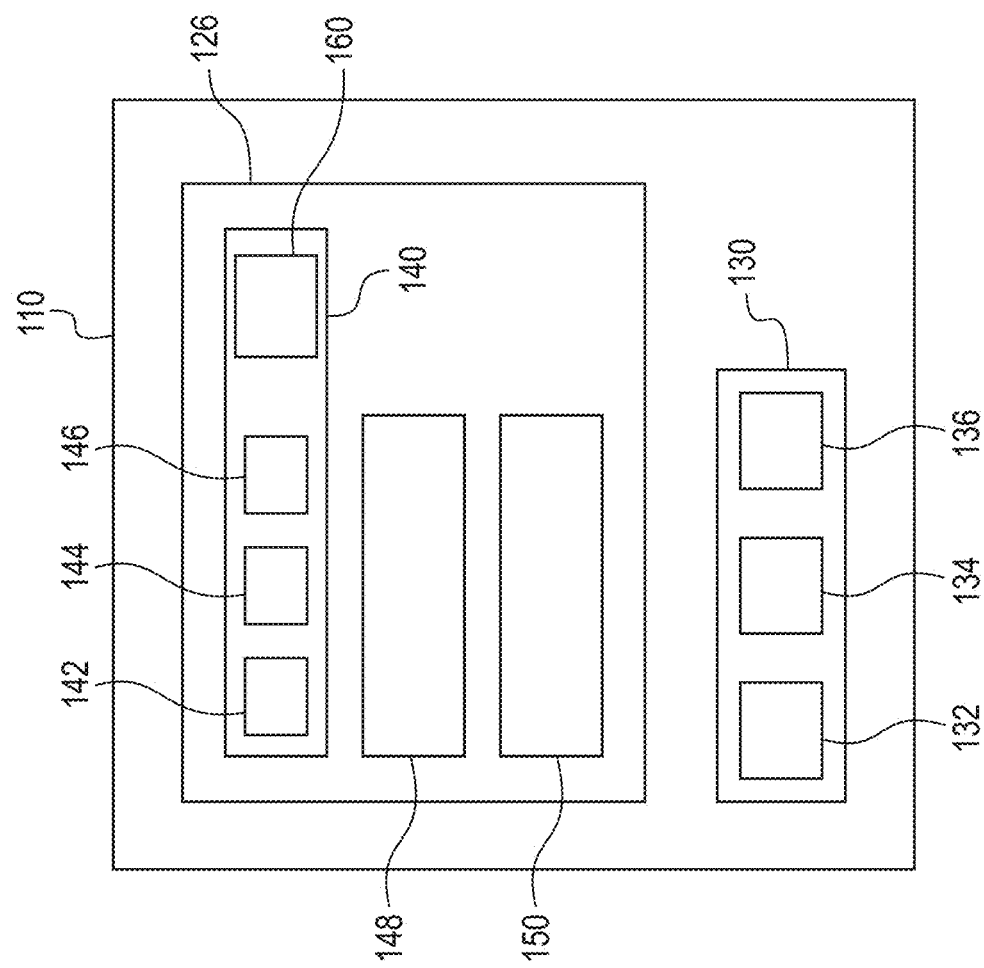

SHADING TOPOGRAPHY IMAGING FOR ROBOTIC UNLOADING

CROSS-REFERENCE

This application claims the benefit of priority to U.S. Provisional Application No. 62/860,307, filed on Jun. 12, 2019, entitled "Shading Topography For Robotic Unloading," the contents of which are hereby incorporated by reference in their entirety, including but not limited to those portions concerning devices, systems, and methods related to vision systems and/or robotic unloading.

FIELD

The present disclosure relates to vision systems, and particularly to vision systems for robotics.

SUMMARY

According to one aspect of the present disclosure, a robotic assembly for handling cargo may comprise at least one robotic appendage for handling cargo; and a vision system for acquiring information to assist operation of the at least one robotic appendage. The vision system may comprise at least two light sources arranged spaced apart from each other; at least one camera configured to capture images of cargo for handling by the robotic assembly; and a vision control system for determining position of cargo. The vision control system may include at least one processor for executing instructions stored on a memory to determine position of cargo based on a shading topography image comprising a blended composite of information of a plurality of images captured by the at least one camera.

In some embodiments, the shading topography image may comprise a convolutional shading topography image comprising a convolution of the plurality of images captured by the at least one camera. The convolution of the plurality of images may comprise convolution of predefined channels of images captured by the at least one camera.

In some embodiments, one of the predefined channels may comprise image data captured under illumination by at least one, but fewer than all, of the at least two light sources, and other image data captured with illumination by at least another one, but fewer than all, of the at least two light sources. The image data captured under illumination by at least one, but fewer than all, of the at least two light sources may comprise image data captured under illumination by one of the at least two light sources having a first upper directional lighting trajectory. The other image data captured with illumination by at least another one, but fewer than all, of the at least two light sources may comprise image data captured under illumination by another one of the at least two light sources having a first lower directional light trajectory.

In some embodiments, another one of the predefined channels may comprise image data captured under illumination by at least one, but fewer than all, of the at least two light sources having a second upper directional light trajectory, different from the first upper directional light trajectory. The another one of the predefined channels may comprise other image data captured with illumination by at least another one, but fewer than all, of the at least two light sources having a second lower directional light trajectory, different from the first lower directional light trajectory. In some embodiments, at least one of the predefined channels may comprise image data captured with illumination by greater than one of the at least two light sources. The image data captured with illumination by greater than one of the at least two light sources may include image data captured under illumination by first and second directional light trajectories for each of the at least two light sources.

In some embodiments, the at least one camera may be arranged between two of the at least two light sources. The at least one camera may be configured to capture at least one image of cargo under illumination by at least one of the at least two light sources and at least another image of cargo under illumination by another one of the at least two light sources. In some embodiments, configuration of the at least one camera to capture the at least one image may include configuration to capture the at least one image under illumination by at least one of the at least two light sources without illumination by another of the at least two light sources. Configuration of the at least one camera to capture the at least another image may include configuration to capture the at least one another image under illumination by at least the another of the at least two light sources without illumination by at least one of the at least one of the at least two light sources.

In some embodiments, the at least one camera may be coupled with a robotic unloading machine comprising the at least one robotic appendage. At least one of the at least two light sources may be coupled with the robotic unloading machine. At least one of the at least two light sources may include a first light having a first directional lighting trajectory and a second light having a second light trajectory.

In some embodiments, the vision control system may be adapted to conduct an imaging sequence including communicating with the at least one camera to capture one or more images of a wall of cargo under a predetermined illumination scheme of the at least two light sources. The predetermined illumination scheme may include one or more images having none of the at least two light sources illuminated, one or more images having all of the at least two light sources illuminated, and/or one or more images having fewer than all of the at least two light sources illuminated.

In some embodiments, the one or more images having fewer than all of the at least two light sources illuminated may include at least one image under illumination by only a first light of one of the at least two light sources having a first directional lighting trajectory. The one or more images having fewer than all of the at least two light sources illuminated may include at least one image under illumination by only a second light of the one of the at least two light sources having a second directional lighting trajectory, different from the first directional lighting trajectory. In some embodiments, the shading topography image may comprise an expression of absolute value of a gradient sum of intensity values of a number of images of cargo acquired by the at least one camera. In some embodiments, the at least two light sources may include two light sources. The two light sources may be a pair of light sources. The two light sources may each have at least two distinct lenses for applying different light trajectories.

According to another aspect of the presented disclosure, a vision system of a robotic assembly for handling cargo may comprise at least two light sources arranged spaced apart from each other; at least one camera configured to capture images of cargo for handling by the robotic assembly; and a vision control system for determining position of cargo. The vision control system may include at least one processor for executing instructions stored on a memory to determine position of cargo based on a shading topography image comprising a blended composite of information of a plurality of images captured by the at least one camera. In some embodiments, the at least two light sources may include two light sources. The two light sources may be a pair of light sources. The two light sources may each have at least two distinct lenses for applying different light trajectories. In some embodiments, the at least one camera is arranged between two of the at least two light sources.

According to another aspect of the present disclosure, a vision system of a robotic assembly for handling cargo may include at least two light sources arranged spaced apart from each other, at least one camera configured to capture images of cargo for handling by the robotic assembly; and a vision control system for determining position or location of cargo. The vision control system may include at least one processor for executing instructions stored on a memory to determine position of cargo based on a shading topography image captured by the at least one camera.

In some embodiments, the shading topography image may include an expression of absolute value of a gradient sum of intensity values of a number of images of cargo acquired by the at least one camera. The at least one camera may be arranged between two of the at least two light sources. The at least one camera may be configured to capture at least one image of cargo under illumination by one of the at least two light sources and at least another image of cargo under illumination by another of the at least two light sources.

In some embodiments, configuration to capture at least one image of cargo under illumination by each of the one and the another of the at least two light sources may include illumination by the one of the at least two light sources without illumination by the another of the at least two light sources. Configuration to capture at least one image of cargo under illumination by each of the one and the another of the at least two light sources may include illumination by the another of the at least two light sources without illumination by the one of the light sources. In some embodiments, the vision system may be configured to determine position of cargo based on a combination of the shading topography image and a stereo depth image.

According to another aspect of the present disclosure, a robotic assembly for handling cargo may include at least one robotic appendage for handling cargo; and a vision system for acquiring information to assist operation of the at least one robotic appendage. The vision system may include a at least two light sources arranged spaced apart from each other, at least one camera configured to capture images of cargo for handling by the at least one robotic appendage; and a vision control system for determining position of cargo. The vision control system may include at least one processor for executing instructions stored on a memory to determine position of cargo based on a shading topography image captured by the at least one camera.

In some embodiments, the shading topography image may include an expression of absolute value of a gradient sum of intensity values of a number of images of cargo acquired by the at least one camera. The at least one camera may be arranged between the at least two light sources. The at least one camera may be coupled with the robotic appendage.

In some embodiments, the at least one camera may be configured to capture at least one image of cargo under illumination by one of the at least two light sources and/or at least another image of cargo under illumination by another of the at least two light sources.

In some embodiments, configuration to capture at least one image of cargo under illumination by each of the one and the another of the at least two light sources may include illumination by the one of the at least two light sources without illumination by the another of the at least two light sources, and/or illumination by the another of the at least two light sources without illumination by the one of the light sources. The vision control system may be configured to determine position of cargo based on a combination of the shading topography image and a stereo depth image.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The patent or application file contains at least one drawing executed in color. Copies of this patent or patent application publication with color drawings) will be provided by the Office upon request and payment of the necessary fee.

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The patent or application file contains at least one drawing executed in color. Copies of this patent or patent application publication with color drawing(s) will be provided by the Office upon request and payment of the necessary fee.

Figure 1:
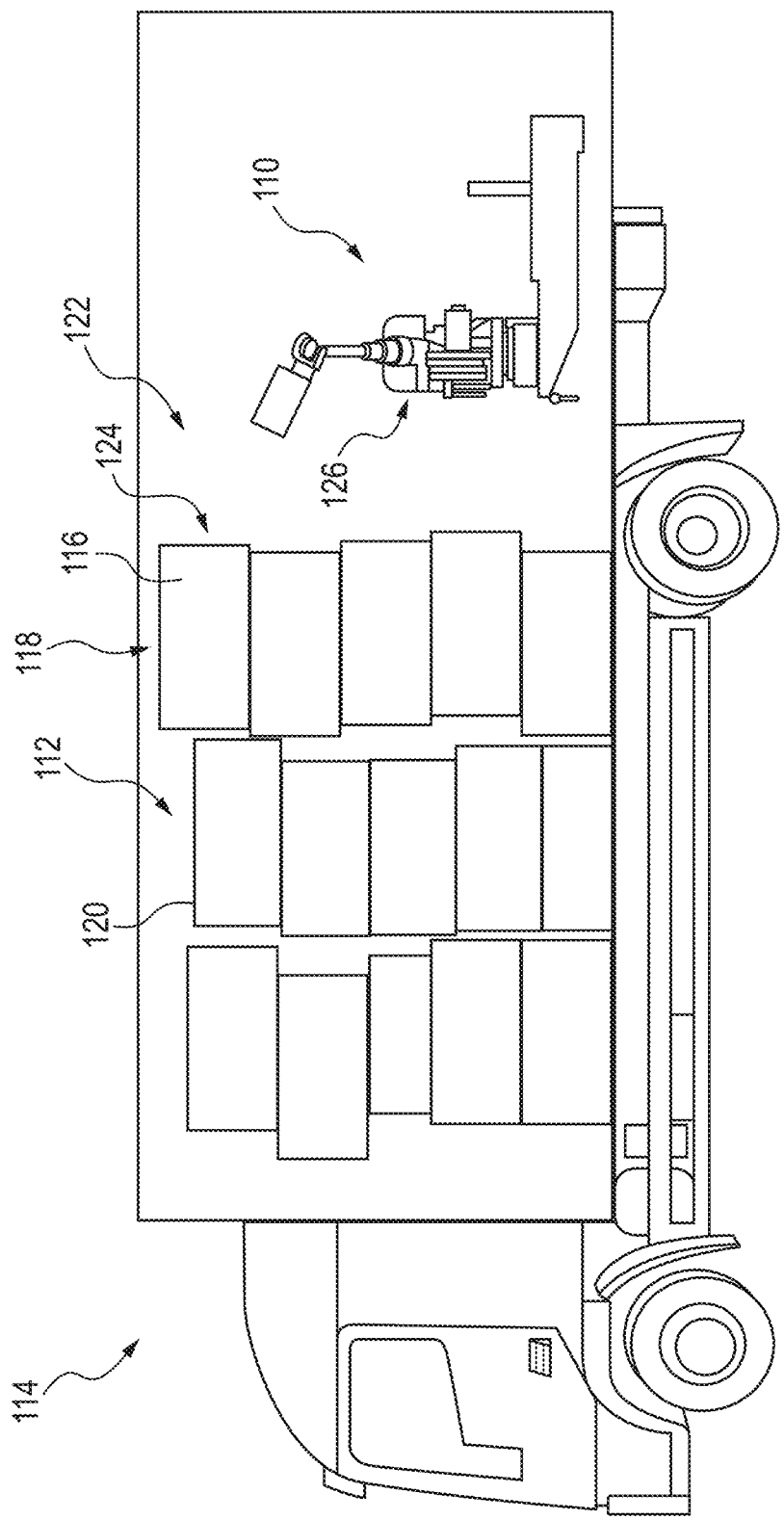
Figure 2:
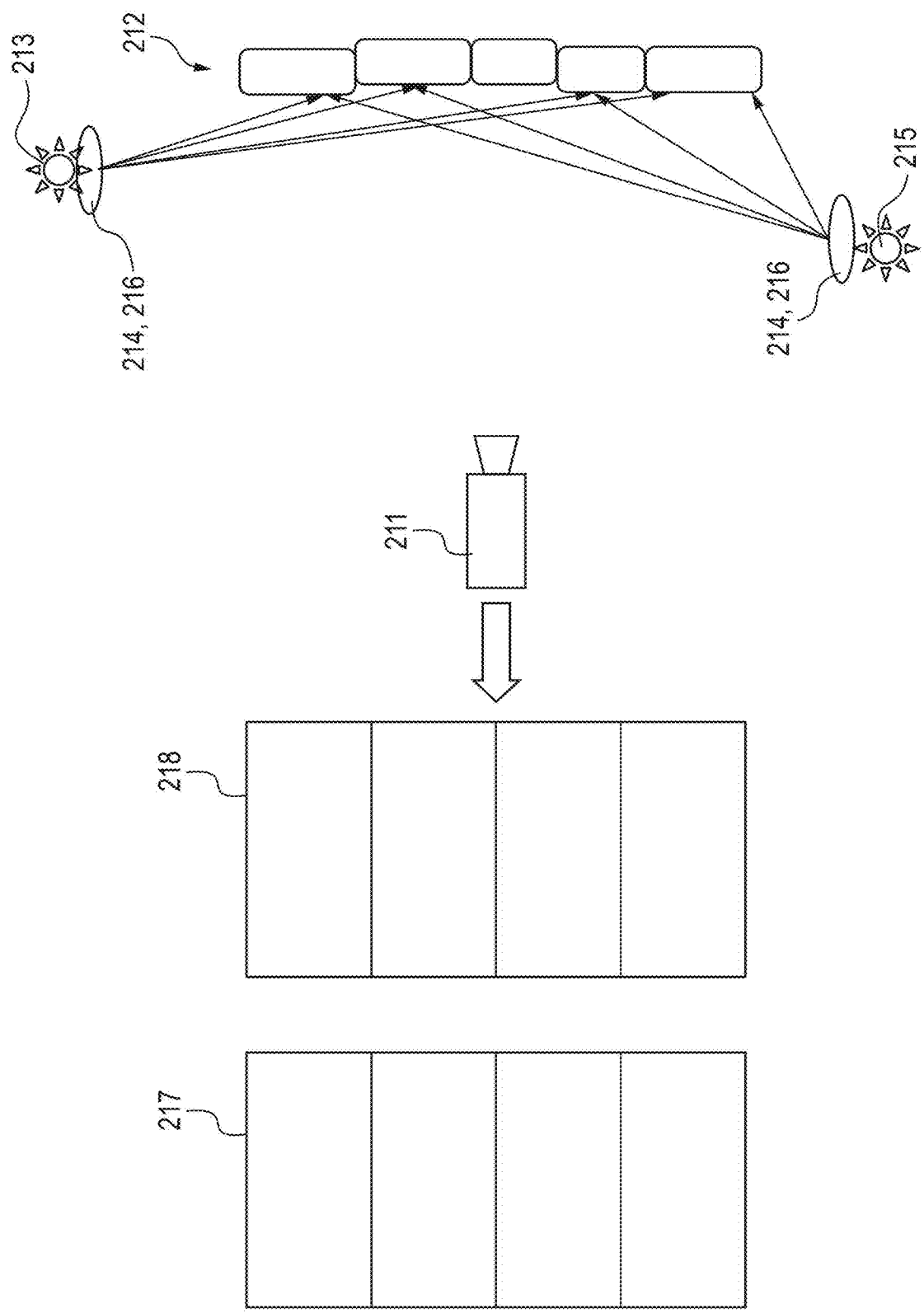
Figure 3:
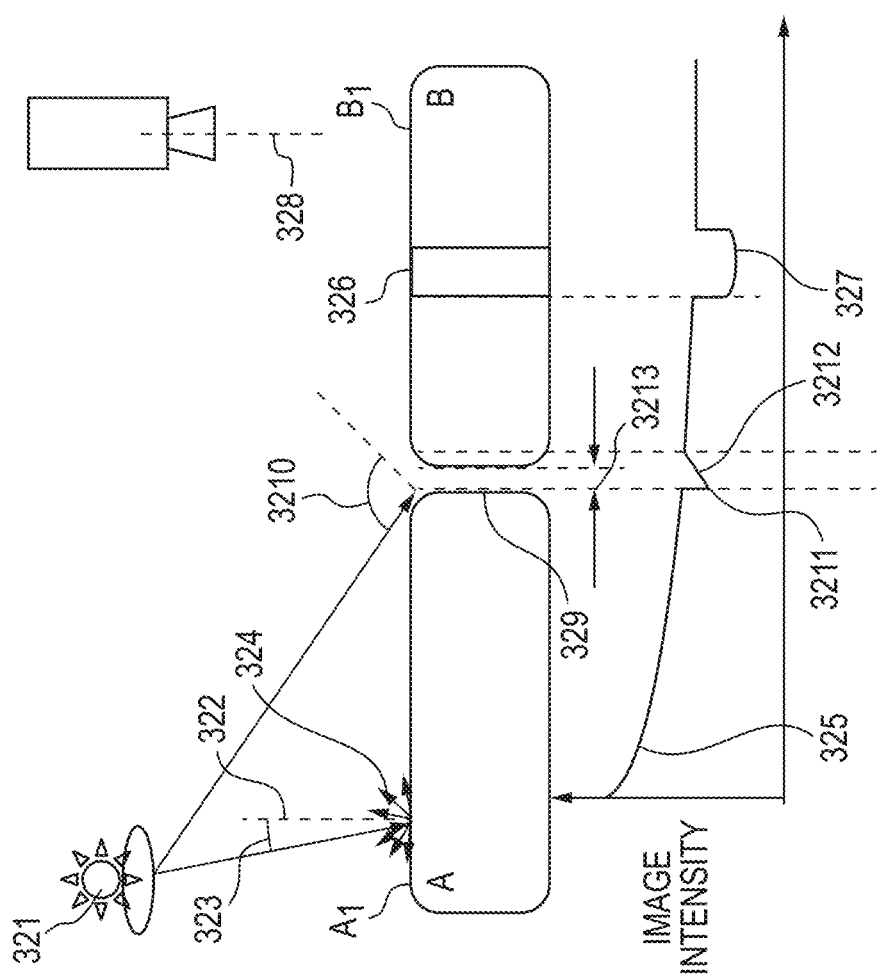
Figure 4:
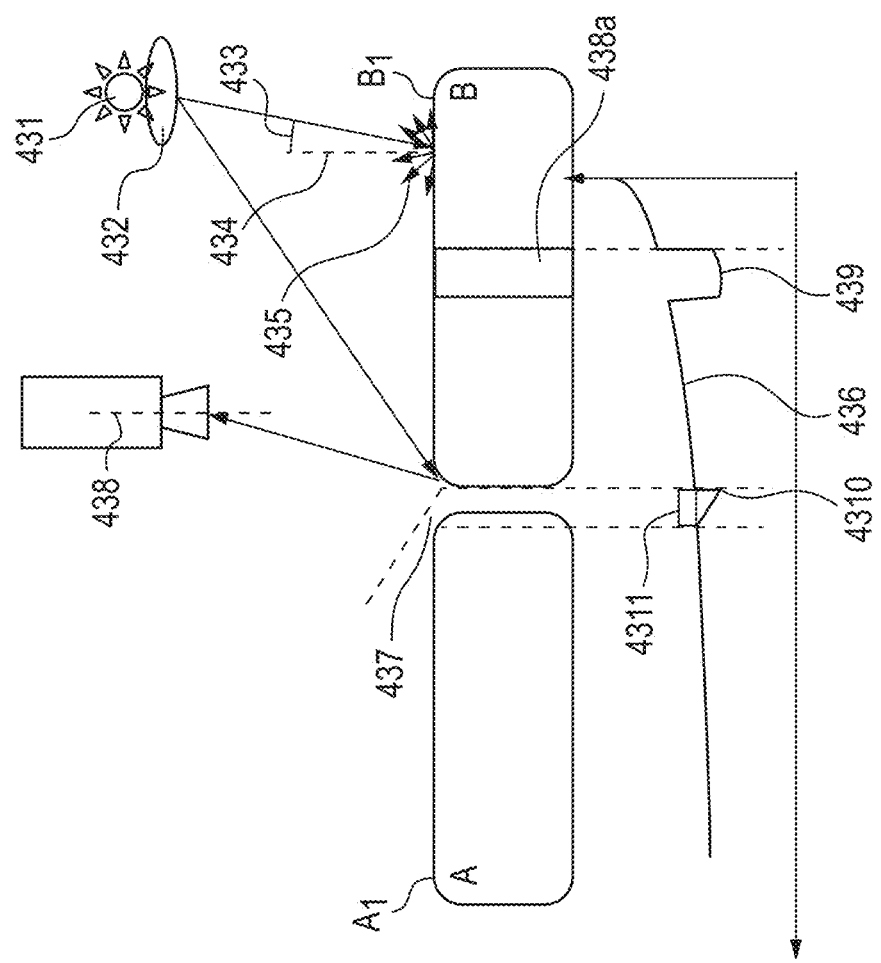
Figure 5:
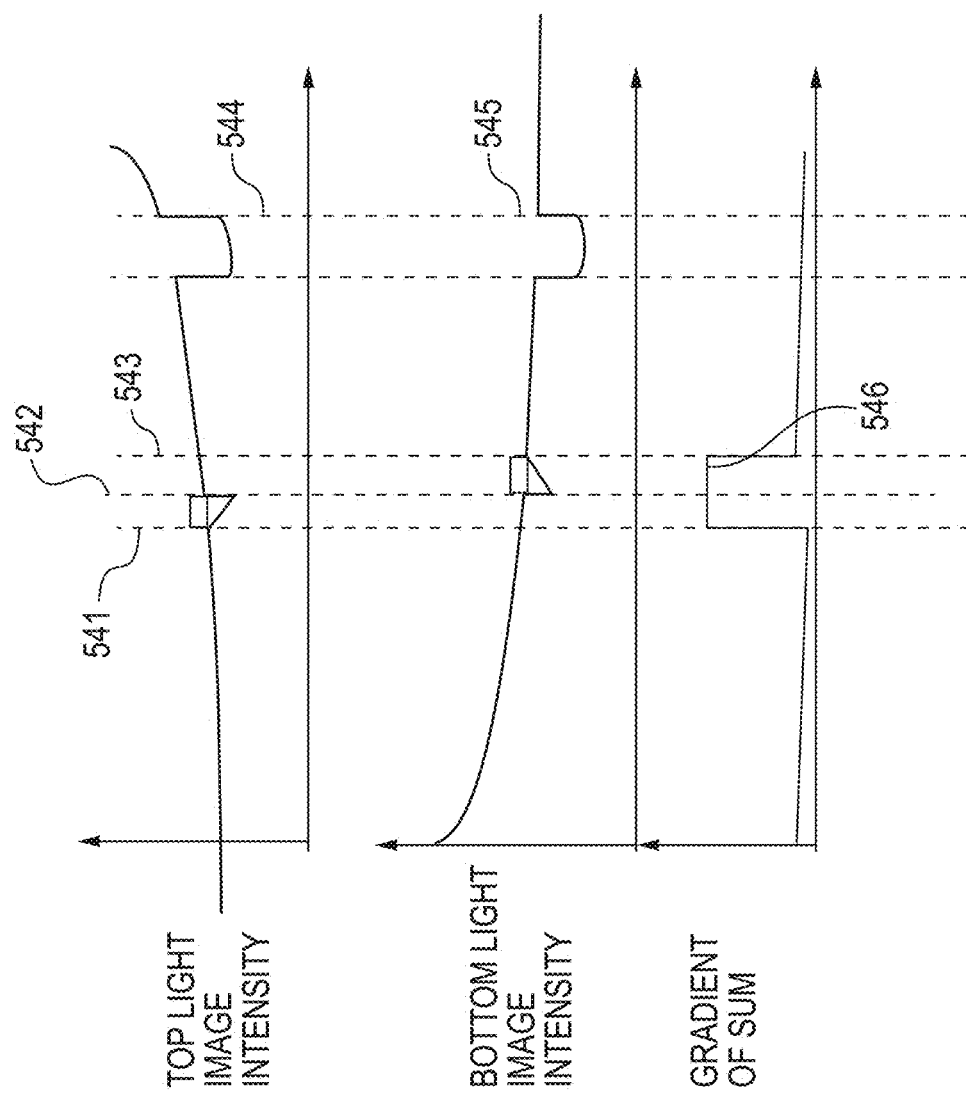
Figure 6:
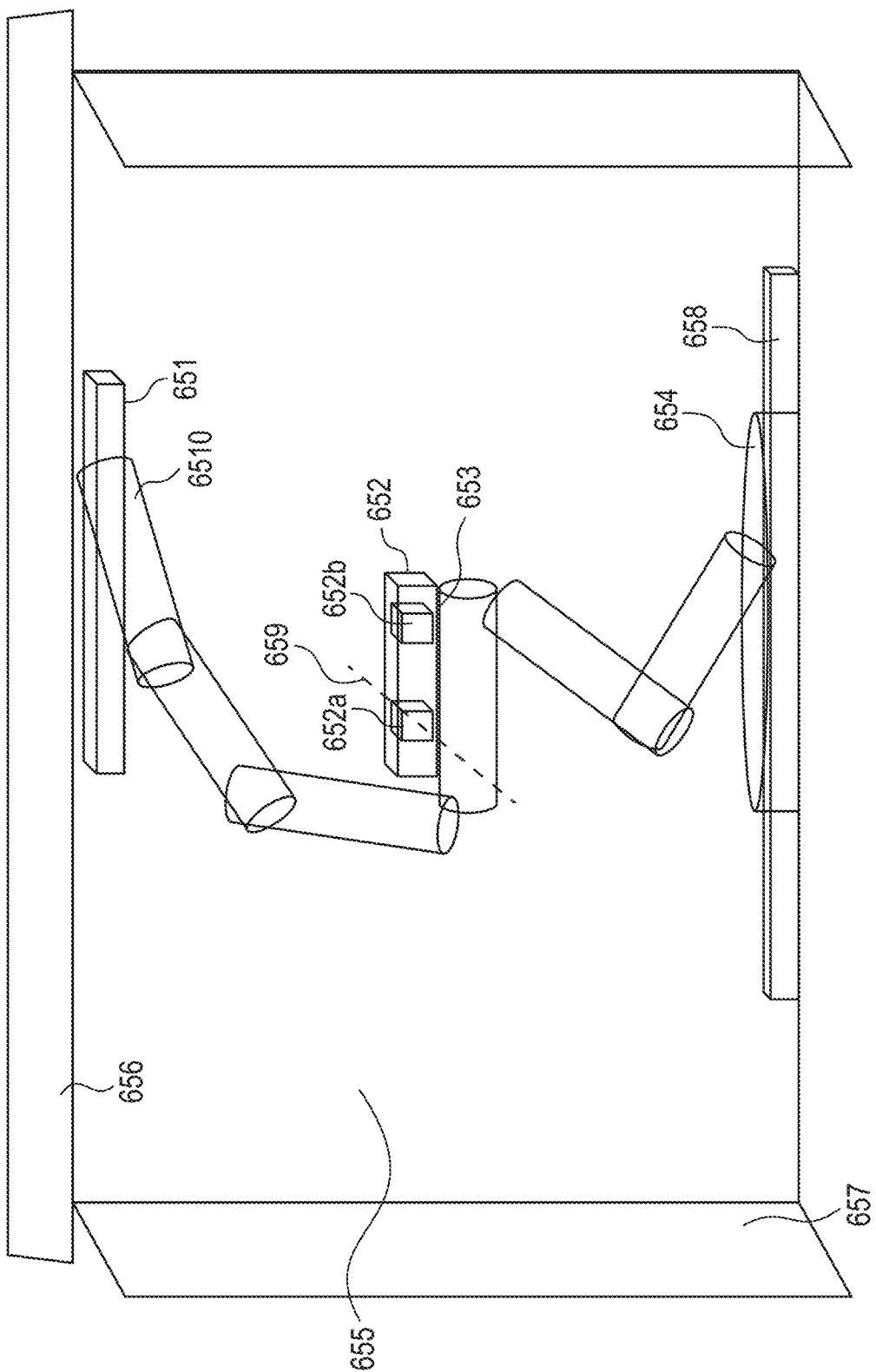
Figure 7:
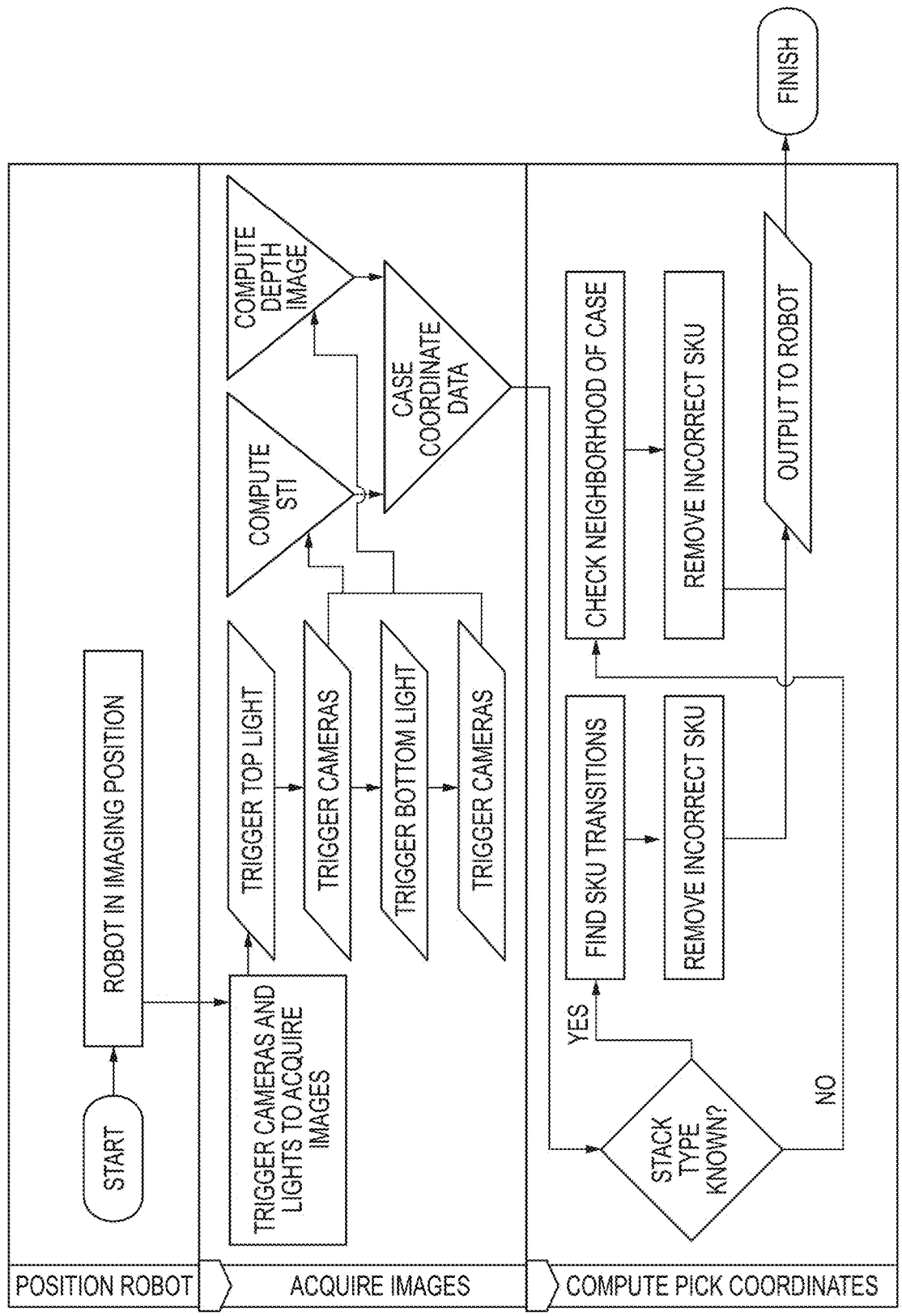
Figure 8:
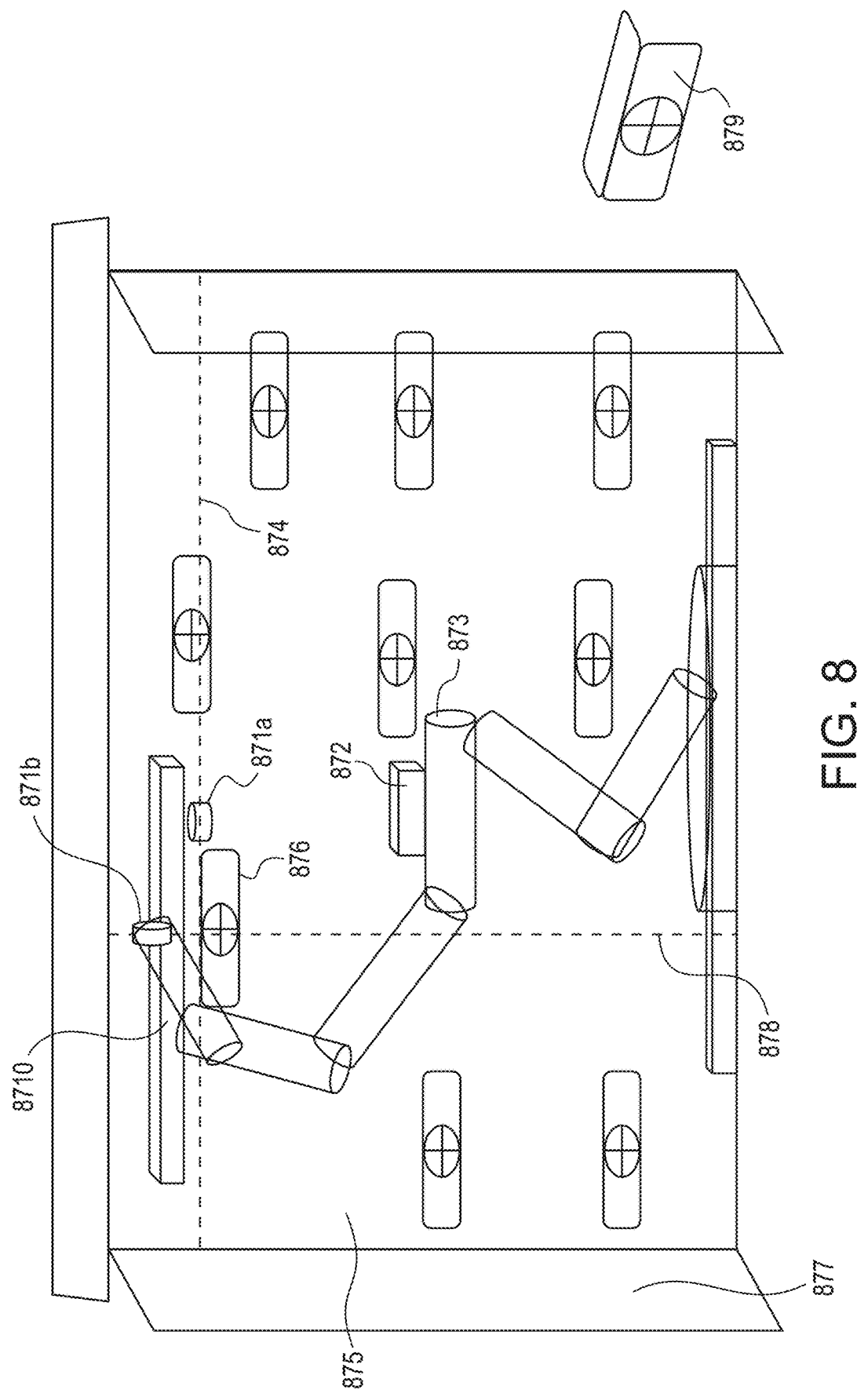
Figure 9:
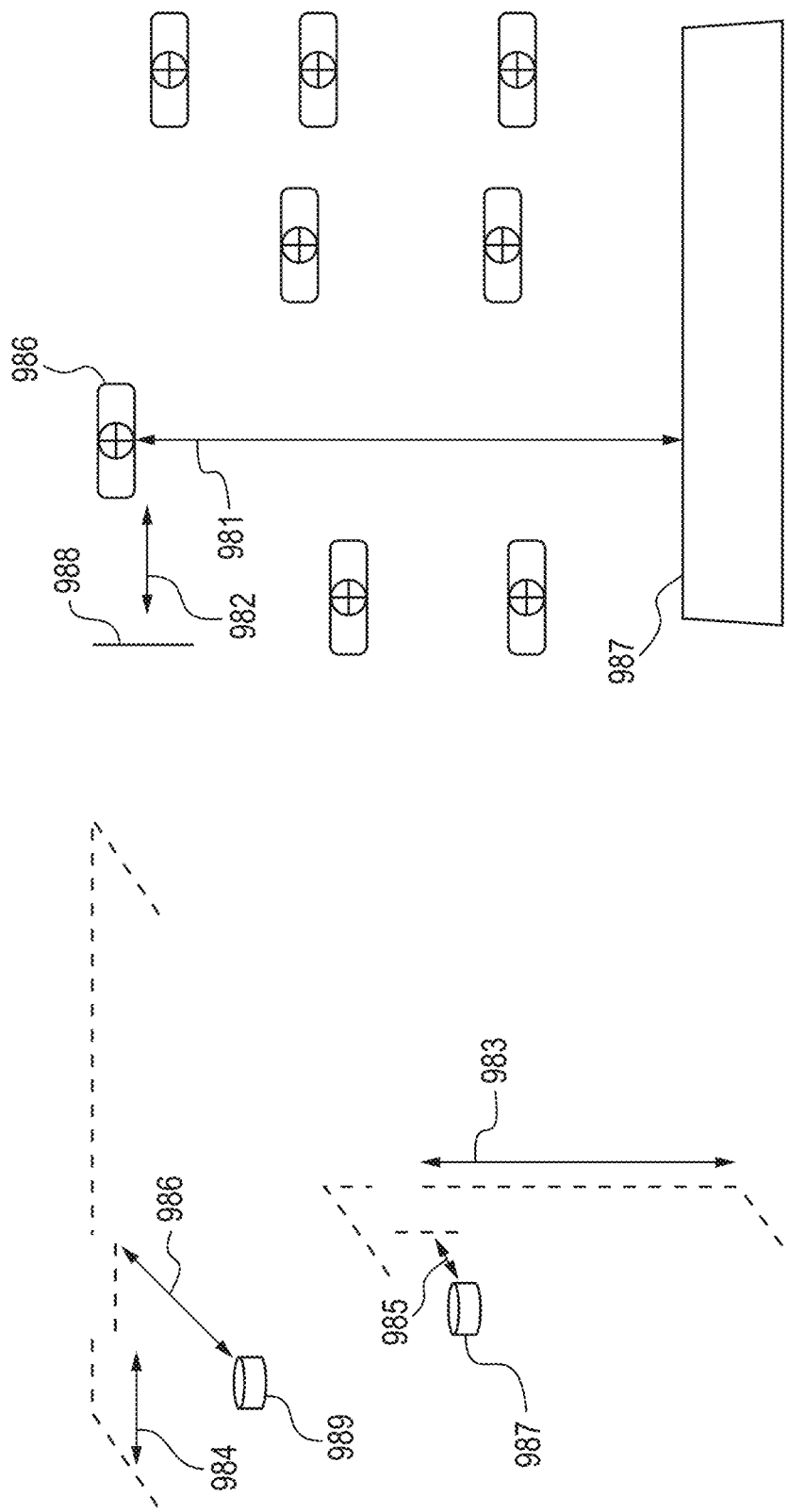
Figure 10:
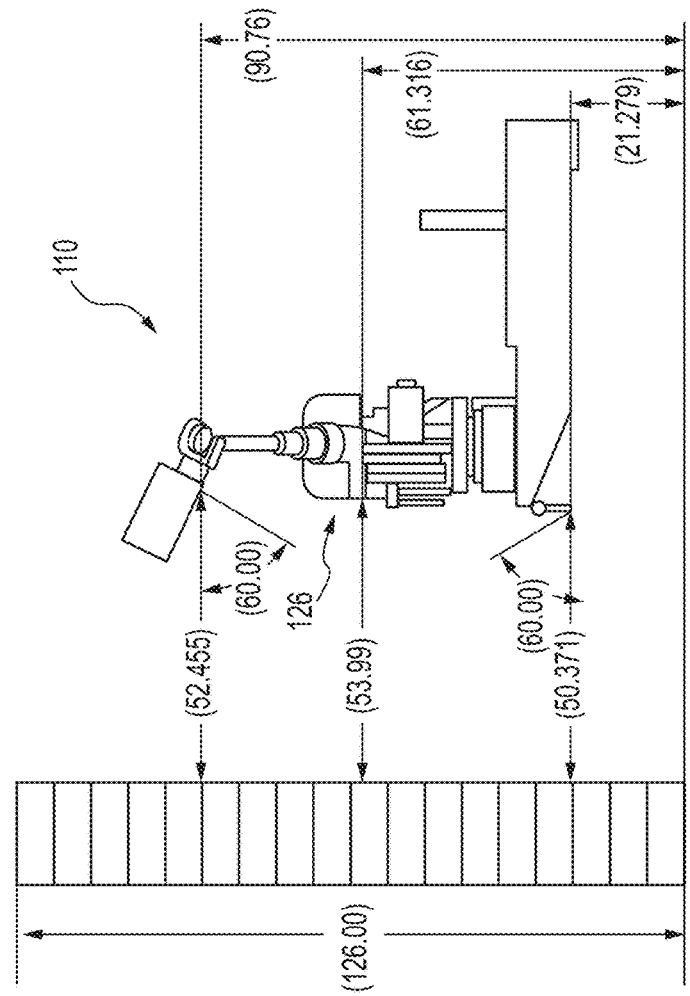
Figure 13B:
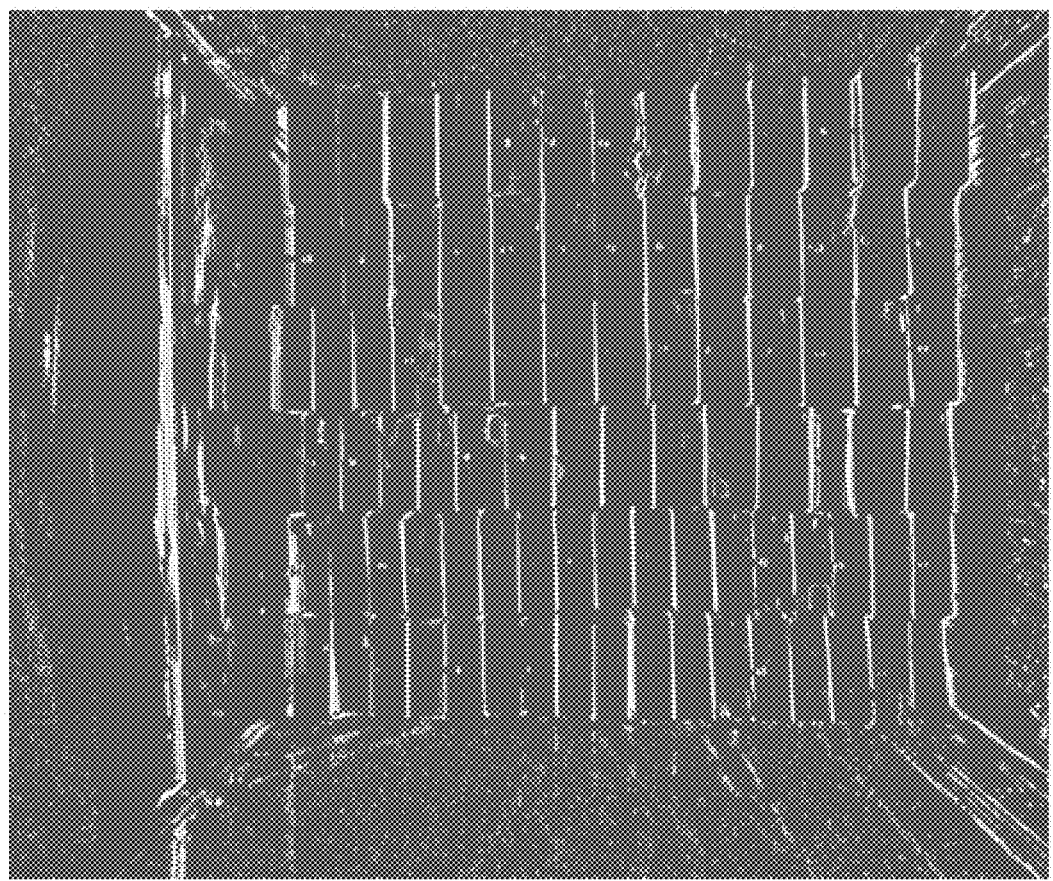
Figure 13A:
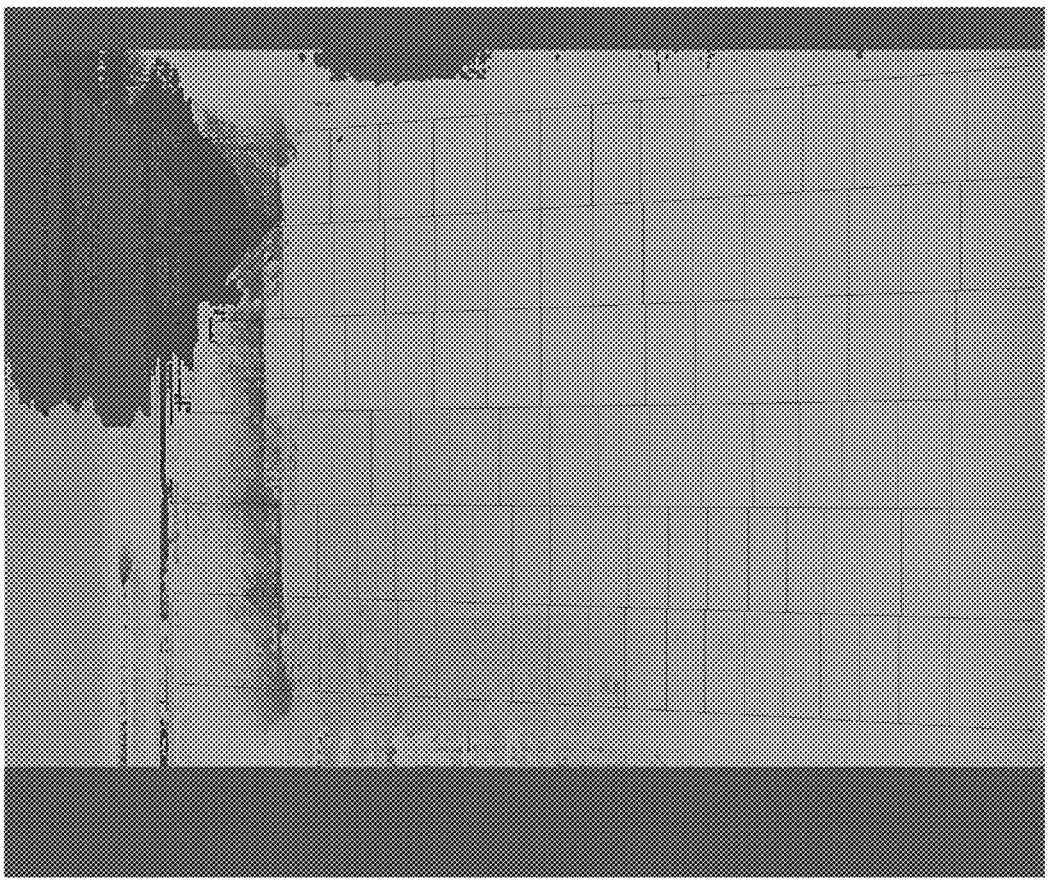
Figure 14B:
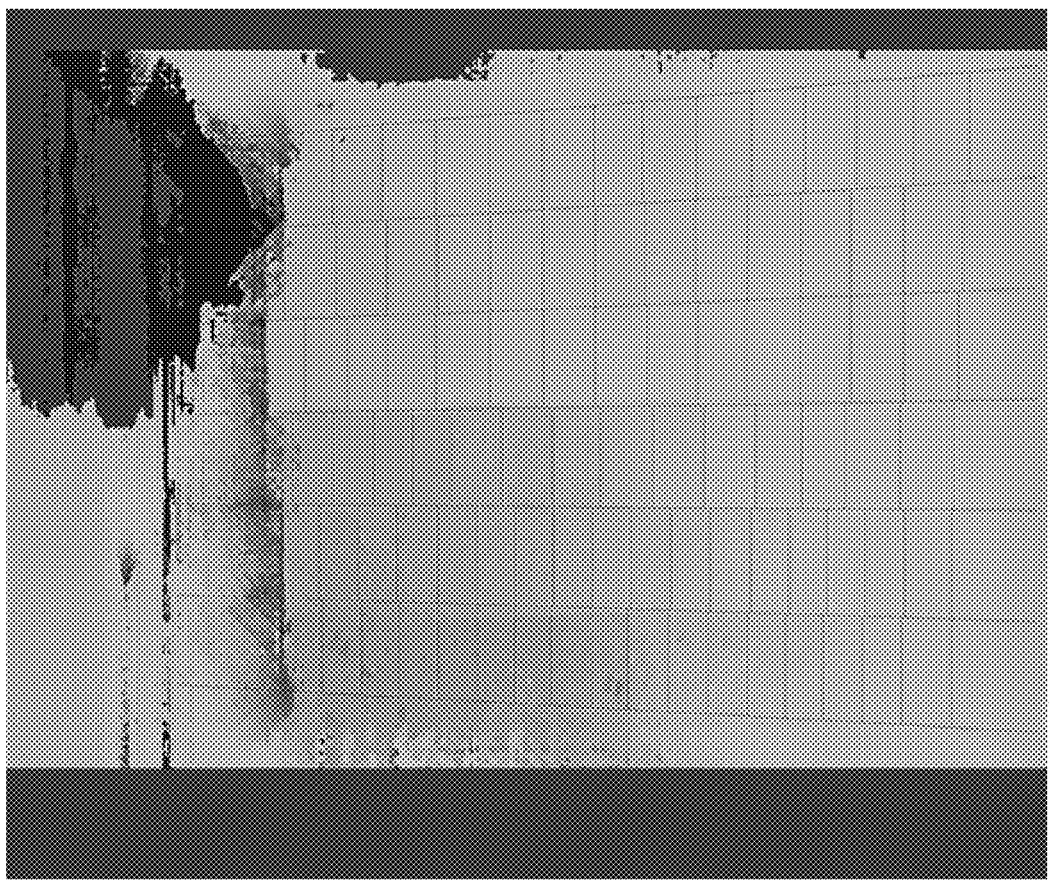
Figure 14A:
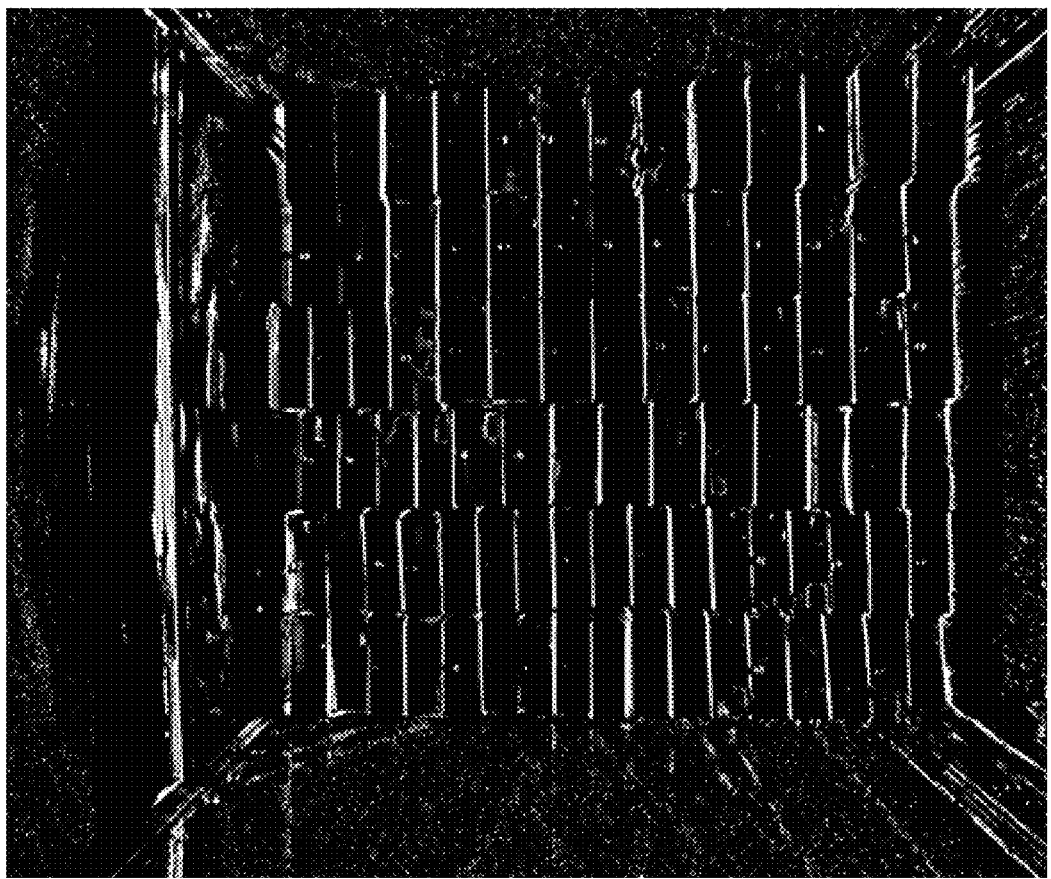
Figure 15:
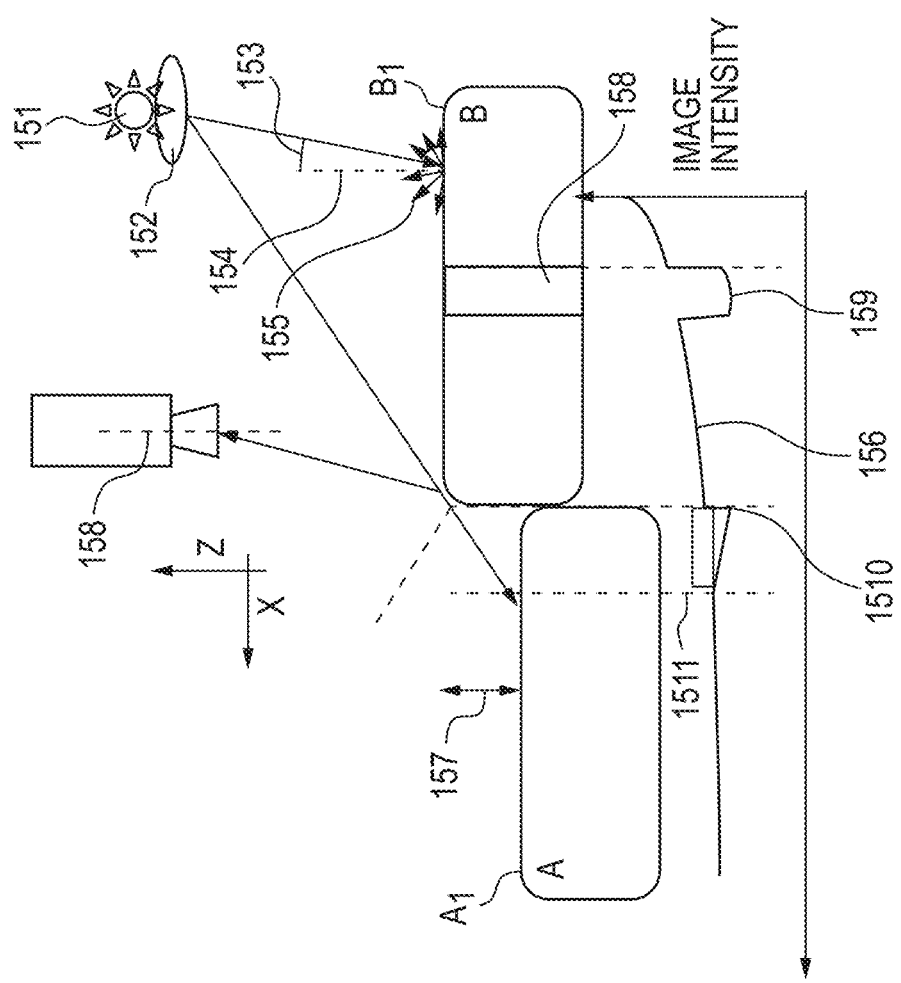
Figure 16:
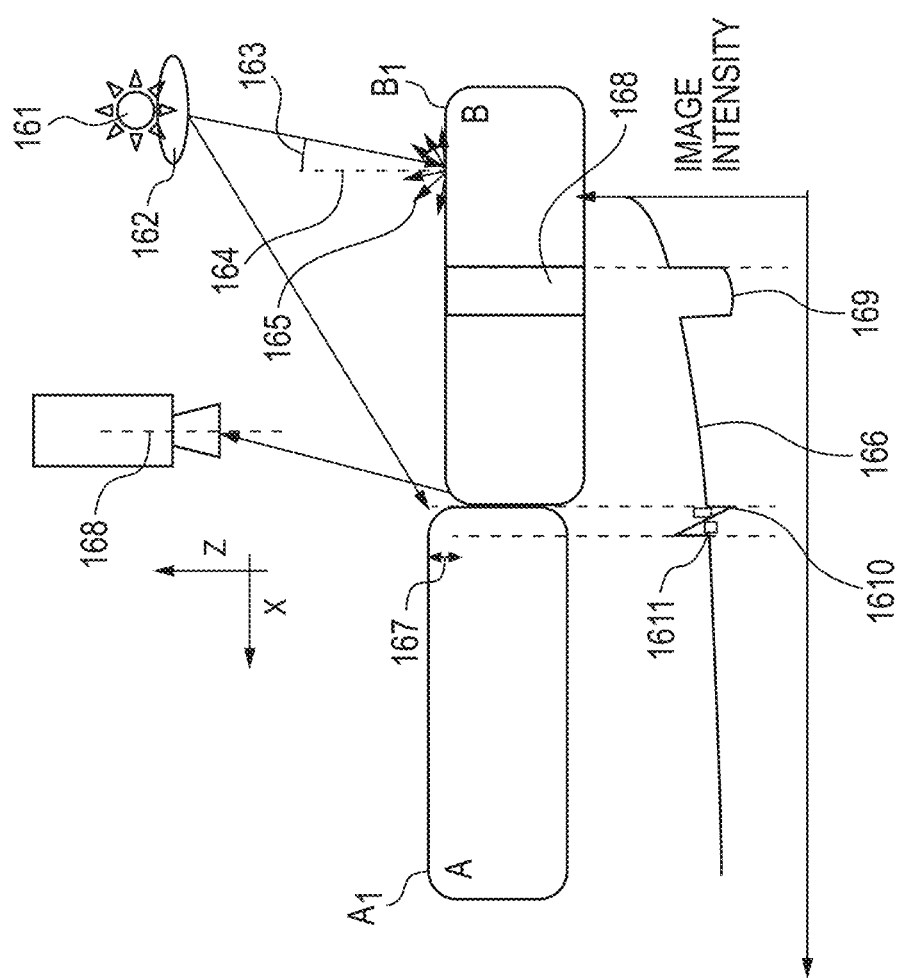

The detailed description particularly refers to the accompanying figures in which:

FIG. 1 is an elevation view of a cargo truck having a cargo trailer rendered transparent to reveal a robotic assembly loaded thereon for handling (loading and/or unloading) cargo, and showing that the robotic assembly includes a shading topography vision system for managing visual information of the cargo to assist in handling the cargo, and showing that the cargo includes a number of cartons stacked to present a carton wall facing the robotic assembly;

FIG. 2 is a diagrammatic view of indicating a principle of the shading topography vision system of the robotic assembly of FIG. 1, and showing an image intensity plot indicating aspects of shading topography;

FIG. 3 is another diagrammatic view of indicating a principle of the shading topography vision system of the robotic assembly of FIG. 1, and showing an image intensity plot indicating aspects of shading topography;

FIG. 4 is another diagrammatic view of indicating a principle of the shading topography vision system of the robotic assembly of FIG. 1, and showing an image intensity plot indicating aspects of shading topography;

FIG. 5 is a diagrammatic view of the image intensity plots of FIGS. 3 and 4, and an combine gradient sum of the image intensity plots of FIGS. 2 and 3, indicating aspects of shading topography;

FIG. 6 is a diagrammatic view of the robotic assembly of FIG. 1 showing exemplary positions of cameras and lights;

FIG. 7 is a flow diagram of a process for determining position or location of cargo;

FIG. 8 is a diagrammatic view of the robotic assembly of FIG. 1 showing an exemplary manner of alignment;

FIG. 9 is a diagrammatic view of the robotic assembly of FIG. 1 showing an exemplary manner of alignment;

FIG. 10 is a diagrammatic view of the robotic assembly of FIG. 1 addressing a carton wall;

FIG. 11 is a depiction of an image captured of a carton wall under illumination by one light of a top light source (left) and a depiction of an image captured of the carton wall under illumination by one light of a bottom light source (right);

FIG. 12 is a depiction of an image captured of a carton wall under illumination by another light of a top light source (left) and a depiction of an image captured of the carton wall under illumination by another light of a bottom light source (right);

FIG. 13A is a color depiction of a shading topography image of the carton wall of FIGS. 11 and 12;

FIG. 13B is a color depiction of a stereo binocular image of the carton wall of FIGS. 11 and 12;

FIG. 14A is the same depiction of the carton wall of FIG. 13A rendered in black in white;

FIG. 14B is the same depiction of the carton wall of FIG. 13B rendered in black in white;

FIG. 15 is another diagrammatic view of indicating a principle of the shading topography vision system of the robotic assembly of FIG. 1, and showing an image intensity plot indicating aspects of shading topography; and FIG. 16 is another diagrammatic view of indicating a principle of the shading topography vision system of the robotic assembly of FIG. 1, and showing an image intensity plot indicating aspects of shading topography; and FIG. 17 is a diagrammatic view of the robotic assembly of FIG. 1 including a neural network.

DETAILED DESCRIPTION

While the concepts of the present disclosure are susceptible to various modifications and alternative forms, specific embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Referring to FIG. 1, a robotic assembly 110 is shown addressing a load of cargo 112. The load of cargo 112 is illustratively arranged within a cargo trailer 114 of a cargo truck. The cargo 112 includes a number of cartons 116 stacked to form carton walls 118, 120. The carton wall 118 presents a face 122 comprising the faces 124 of each of the cartons 116 of the carton wall 118. The carton wall 118 illustratively includes five cartons 116 stacked vertically and forming a single column, and may include any suitable number of columns extending into the page, across the width of the trailer 114. In some instances, cartons 116 of one column may intermingle with other columns, depending on size and position within the carton wall 118. Each of the five cartons 116 illustratively forms a portion of a corresponding row of cartons 116 of the carton wall 118, which collectively make up the carton wall 118. An example of a carton wall can be observed in FIGS. 11 and 12.

In handling the cartons 116, for example, to perform (partly or fully) autonomous robotic unloading of the trailer 114, the robotic assembly 110 may determine a location of the individual cartons 116 to assist in picking (grabbing and/or lifting the carton) safely and/or effectively. The robotic assembly 110 illustratively includes a vision system 126 for determining carton location or position. The vision system 126 is illustratively embodied as a shading topography vision system which can develop a shading topography image for use in efficiently detecting carton position or location.

Computerized vision approaches (vision systems) and Light Detection and Ranging (Lidar) can combine to produce detailed 3-dimensional (3D) views in conventional robotic guidance systems. Vision systems can rely on ambient lighting and/or use integrated lighting to capture or form an image. Infrared and/or near-infrared lighting can be used by vision systems, for example, to assist in avoiding and/or filtering out interference from visible lights, such as ambient and/or uncontrolled background light. 3D imaging may be applied as a type of vision system used in robotic guidance. Depth information may be obtained from time-of-flight, Lidar or stereo imaging approaches in vision systems. Time-of-flight vision systems can use light pulses to determine the distance of objects, and can be limited to depth maps with about 1 cm (0.4 inch) resolution depending on the sophistication of the electronics and/or techniques. Binocular stereo can use two cameras arranged to create shift in the image (disparity) that can be related to the depth at that point. Small and/or abrupt depth transitions may not be detectable with this technique.

Vision guidance for robotic picking can use 3D imaging with any combination of the techniques mentioned above to detect the pick coordinates for navigation to by a robot. For many applications where the depth variation may be expected to be within the capabilities of these techniques, the approach can be successful, for example, as mentioned within U.S. Pat. No. 7,313,464 B1, issued on Dec. 25, 2007, the contents of which are hereby incorporated by reference in their entirety, including but without limitation, those portions related to robotic operations. Vision systems for robotic picking can use color and/or depth information to determine boundaries of one or more of the objects to be picked. Vision systems may be used to guide robots to pick from stacks of cartons on a floor. Conventional approaches to vision systems may focused on picking of cartons with large differences in depth and/or color that may allow the location of the cartons to be determined using this information.

Walls of cartons, for example the carton wall 118, within a trailer can pose unique challenges for vision systems. For example, a trailer may be about 98.4 inches by about 98.4 inches (2500 mm by 2500 mm) wide by tall, while the interface between the cartons of its cargo can be merely fractions of an inch (few millimeters) wide and/or deep. Cartons may have no markings and/or may be covered in artwork that can differ between any two cartons. The cartons may be densely packed to fully utilize the space in the trailer. The cartons may be filled with product that can be heavy and cause the interface between cartons to be compressed. Conventional methods may not present solutions including vision systems capable of determining the location of some or all of the cartons stacked in a wall within a trailer without significant depth and/or visual variation between adjacent cartons.

The topography of the surface (face) of a wall of cartons stacked inside a trailer can assist in robotic picking of the cartons. The location of the interfaces between cartons can be combined with the depths between the cartons to generate pick coordinates for a robot in handling the cartons.

For example, an industrial robot may be a six-axis robot for handling the weight of cartons filled with product, such as to move them at high speed to another location. An exemplary maximum reach of such a robot is about 78.8 inches (2 m). For a vision system to be used to guide the robot, it generally may be mounted on the robot. Since the robot may need to be at the picking location relative to each wall, the lighting of the vision system may be required to move with the robot. In some embodiments, the vision system 126, cameras 130, and/or light sources 150, may be partly or wholly mounted apart from the robotic assembly 110, for example, one light source 150 may be mounted apart from the robotic assembly 110 while another is mounted on the robotic assembly 150.

Within the present disclosure, a vision system may apply two light sources arranged at different positions so that the vision system can detect the precise location of interfaces between cartons. The cartons may include arbitrary and/or unknown artwork on their sides. The location of the interfaces may be communicated to the robot control system in its coordinate space, for example, after an alignment procedure between the robot and the vision system. Unlike Photometric Stereo approaches, calibration at each instance of the robot addressing cargo having different environmental lighting aspects can be avoided and/or may not be required to detect the interfaces. Examples of suitable robotic cargo handling devices, systems, and/or methods may be found within U.S. Patent Application Publication Nos. 2015/0352721 A1, filed on Jun. 4, 2015, and 2016/0068357 A1, filed on Sep. 5, 2014, the contents of each of which are hereby incorporated by reference in their entireties, including but without limitation, those portions related to robotic operations.

Shape-from-shading can involve estimation of surface topography in a single image with a single known light source. Since the intensity of the reflected light at a point in the image can depend on its reflectance (bright to dark) and its orientation with respect to the light and the observer (camera), the depth of the point may not be able to be unambiguously computed from one image and one light for the general case. For example, a point on a surface can appear to be dark because of its color (reflectance), perhaps, because it is oriented leaning away from the camera. To overcome this issue, Photometric Stereo (PS) can use at least three (3) lights oriented orthogonal to each other, and three (3) images, to estimate both the depth and the reflectance at a point. Robotic picking applications can be constrained by the placement of the lights and/or cameras and may not allow the placement of the three lights to illuminate the entire region that the robot needs to be guided. PS can require a calibration with objects of known shape and reflection, on each instance of addressing a target, such as cargo. Since the position, angle and/or intensity of the lights affect the reflected light intensity in addition to the local reflectance and the surface shape (surface normal), PS can require a calibration to create a model of the known lighting variation within the field of view for all of the lights and/or camera positions. This may need to be recomputed if a light changes in intensity, position, or orientation over time, for example, due to thermal changes, lights and/or lenses becoming soiled, and/or generally as they age over time. Recalibration may be required for any change of camera position, orientation, or optics. Specular surfaces within the field of view may need additional constraints and/or calibration. Further the walls of a trailer are typically metal which can result in various specular reflections.

Topography can include the map of a terrain or any surface illustrating the topographical features of the terrain or surface. Devices, systems, and methods within the present disclosure may use lights with preferred lensing placed at desired locations to produce shading over the surface of a wall of cartons.

As shown in FIG. 2, lights sources 213, 215 can be arranged to illuminate a wall of cartons 212, for example, from the top and bottom, in a cargo arrangement such as within a trailer. An image of the carton wall 212 can be captured by the camera 211 which can be arranged centrally in the trailer. A single camera 211 is shown for descriptive purpose, yet multiple cameras 211 may be applied. The carton wall 212 is analogous to the carton wall 118 for descriptive purposes in disclosing the application of shading topography imaging.

The top and bottom lights sources 213, 215 may be turned on (illuminated) sequentially and/or in series to assist in capturing images. Each of the top and bottom light sources 213, 215 may have multiple lights, and the different lights of each light source 213, 215 may have a different lens 214, 216. The lights of each light source 213, 215 may be formed as one or more light emitting diodes (LEDs). The LEDs may be strobed with emission at 850 nm wavelength. The light sources 213, 215 may each be individually synchronized to the camera's exposure active signal.

One or more cameras 211 may each be embodied as a CMOS sensor. The camera(s) 211 may have high response at the 850 nm wavelength and may have large pixel size (>4 microns) to reduce the amount of lighting required to sufficiently illuminate the entire wall of cartons 212. Camera exposure may be varied for each acquired image, and a sequence of exposures can be used to acquire high dynamic range images. High dynamic range images can include, for example, an image formed as a synthesis of one or more acquired images having different exposures in which a selected pixel value for each pixel of the high dynamic image is selected as the greatest pixel value for that pixel among the acquired images, and if the selected pixel value is saturated (for example, 255 in a 8 bit image) then the saturated value can be replaced by the next lower pixel value for that pixel among the acquired images. The camera(s) 211 may be mounted on the robot frame, as a portion of the robotic assembly 110, and may therefore be arranged to be within about 60 inches (1500 mm) of the wall, for typical industrial 6-axis robots.

A lens of the camera(s) 211 for imaging the carton wall 212 may illustratively include a lens focal length of about 0.12 inches (3 mm) which can provide a wide angle of acceptance and a resulting field of view of about 98×about 98 inches (2500×2500 mm). With a CMOS sensor, for example, Sony's IMX sensors with 2000×2000 pixels, the vision system may have a resolution of about 0.04 inches (1 mm) per pixel. The wide angle of acceptance of the camera lens can require that the image be corrected for lens distortion to provide accurate pick coordinates for the robot. A narrow bandpass filter of about 850 nm can be placed between the lens and the camera. The wide acceptance angle of the lens can be assisted by this arrangement to reduce the amount of stray light that can enter the camera(s). Each camera 211 may be arranged in communication with a computer, for example, via a Gigabit Ethernet cable. The camera(s) 211 may be powered over the same cable with a Power over Ethernet card in the computer. In some embodiments, the camera may communicate wirelessly with the computer. The computer may be configured to turn off the camera(s) when the camera(s) is/are not in use. A high-flex cable with over 10 million cycles of flex and a protective sheath may be used to avoid damage to the cable while in operation. Active cooling of the cameras can be applied, for example, by the use of a copper heatsink and a fan.

The camera(s) 211 may capture images of the carton wall 212 under different illumination schemes. For example, the camera(s) 211 may capture an image 217 under illumination by only the light source 213 as an upper light source, and/or the camera(s) 211 may capture an image 218 under illumination by only the light source 215 as an lower light source.

In one example of operation, six images may be obtained with each of two cameras 211. The sequencing of each image capture can be performed by a specific hardware pulse generator that turns on each light and camera in synch as appropriate for the sequence. This can allow for all of the images to be captured by the cameras within a brief timeframe, for example, about one second. The cameras may be capable of 30 frames per second. However, some of the exposure times may be longer than others and may add up to one second. In no particular order, among the exemplary six photo images (image sets) may include one image for each of the following characteristics:

1. No lights—8 bit image
2. Lights for binocular stereo—8 bit image
3. Top light angle 1—12 bit image
4. Top light angle 2—12 bit image
5. Bottom light angle 1—12 bit image
6. Bottom light angle 2—12 bit image FIGS. 3 and 4 illustrate the principle of shading topography in two dimensions between adjacent cartons A, B having their upper surfaces $A_1$, $B_1$ parallel and in line with no difference in depth. In FIG. 3, the camera axis 328 splits the viewing plane into two half planes, one half plane to the right, and one half plane to the left of the axis 328. The light source 321 is illustratively positioned in the same half plane as the interface between the cartons 329. For cartons manufactured with cardboards, plastics, and other non-metallic materials the surface can be diffuse and may scatter the light in many directions, as suggested by numeral 324. The scattered light intensity can be estimated by using a model such as the Lambertian Bidirectional reflectance Distribution Function (BRDF).

For descriptive purposes, in the lower region of FIG. 3, the intensity of the scattered light is plotted by line 325 depending on the incident light intensity, which follows a generally inverse square relationship to the distance from the light source 321. The scattered light intensity 325 may also depend linearly on the cosine of the angle 323 between the surface normal 322 and the incident ray from the light source 321. At the location of the carton interface 329 the angle of incidence 321 is nearly 90 degrees and so the light intensity falls sharply as illustrated at numeral 3211. As the surface normal changes back to the orientation in 322 the intensity line 325 returns to the trend of line 325.

The finite extent of the drop in intensity is suggested in numeral 3212 and is illustratively larger than the gap 3213 between the cartons A, B. This can result in an effective magnification of the interface region which can be an advantage of the Shading Topography Image (STI) technique. The intensity drop signals, which are interpreted to apply the STI technique, do not rely on a difference in depth between the cartons A, B (from the camera and the light sources). Independence from the depth of cartons can be an advantage over any depth-based systems in detecting the interface between the cartons A, B, for example, in real world scenarios where a difference in depth may not exist. Even with zero gap between the cartons A, B, and/or with zero difference in depth between the cartons the shading region is finite. Accordingly, STI techniques within the present disclosure can efficiently address such low differential instances.

The scattered intensity can also depend on the reflectance of the surface ($A_1$, $B_1$), For example, the area 326 is depicted as an area of the carton B where the reflectance of the surface $B_1$ is lower than the rest of the carton B. The lower reflectance at the area 326 is observed on the line 325 at numeral 327 which shows a drop in the observed intensity due to the lower reflectance of the area 326. The area 326 may represent a graphic on the carton, and/or other disturbance in reflectance.

Referring now to FIG. 4, the camera axis 438 splits the plane into two half planes. In this case the light source 431 is in the other half plane (on the right side of the camera axis 438 in the orientation as shown in FIG. 4) compared with the arrangement in FIG. 3, and to the right of the interface 437 between the cartons A, B. This arrangement changes the geometry of the light scattering from the interface 437 between the cartons A, B which is indicated by a sharp drop 4310 in the image intensity plot 436. Notably, as the light source 431 is oriented in the other half relative to that in FIG. 3, the intensity drop 4310 in FIG. 4 is more pronounced on the right side of the plot 436, while the intensity drop 3211 in FIG. 3 is more pronounced on the left side of the plot 325. The intensity of each drop 3211, 436 climbs back to the trend in approaching the camera position. The area 438a represents an area of low reflectance similar to area 326 in FIG. 3.

Referring now to FIG. 5, the intensity plots of the images acquired under the lights sources 321, 431 from the examples of FIGS. 3 and 4 are shown, which are illustratively embodied as upper 321 and lower 431 lights. The dotted line 542 represents the location of the interface between the cartons A, B. Lines 541 and 543 correspond to the extent of the shading perceived by the camera of numerals 4310 and 3211. The absolute value of the gradient of the sum of the individual intensity plots 325, 436, as plotted in 546, shows a distinct stepwise increase in the intensity at the position of the lines 541, 542, 543, which provides a clear signal that can be used to identify the location of the interface of the cartons A, B. Note that the change in intensity due to artwork 544, 545 is not highly perceivable in the gradient sum plot, because the position of the artwork (i.e., 326, 438a, represented respectively at 544 and 545) is the same in both the top and bottom lit image intensities. The STI signal contrast is dependent on the cosine of the angle of the source light to the surface normal, thus, at normal incidence the signal can be the largest.

The process discussed above can be applied to locate the horizontal and/or vertical interfaces of the cartons A, B. The STI image can be generated with just two light sources (bars), which can be positioned close to the top and bottom of the carton wall. In the illustrative embodiment, the lights can between about 35 inches (900 mm) to about 71 inches (1800 mm) long. They can incorporate multiple LED's which may be spaced evenly from each other for a given light source. The lights of each light source may be lensed individually and/or may be controlled in segments of about 12 inches (300 mm) lengths arranged laterally with respect to the carton wall. By acquiring images with individual segments of lights, the vertical interfaces of the cartons can be highlighted in the STI image. To locate the horizontal interfaces, all of the segments of lights can turned on during image acquisition.

Although labeled "top" and "bottom" the lights can be interchanged and can be placed in a range of locations in each half plane. For the creation of a Shading Topography Image (STI) the lights should be in different half planes, defined by the camera axis, and should be oriented parallel to the camera axis or towards the camera axis. For a given size of a wall of cartons and the possible locations that a camera can be placed centrally on a robot, the lights should be placed at preferred locations for optimal performance of STI. For example, for a 6-axis robot, the preferred location for placement of the camera(s) for STI can be on Joint 3 (J3—653) of the robot as shown in FIG. 6. In the illustrative embodiment, the cameras 652a, 652b are illustratively arranged equally spaced apart from a center line 659 by about 3 inches, although in some embodiments, each camera 652a, 652b may be spaced from the centerline 659 by any suitable amount, for example but without limitation from about 0 to about 6 inches. The cameras 652a, 652b are illustratively arranged centrally in the width and height of the trailer, but in some embodiments, may be off-center with suitable data correction. In the illustrative embodiments, positioning the camera for imaging may include the angles of the joints as shown in FIG. 6, including a level horizontal arrangement of the Joint 3 (J3—653) positioning the cameras 652a, 652b horizontally level relative to each other. This arrangement can allow the camera to view the entire carton wall without occlusion. The camera axis 659 divides the plane of the carton wall into the top and bottom portions and the lights for creating the STI are arranged in the top and bottom half planes.

The distance between the carton wall and the camera may be optimally determined in consideration of the following. In some embodiments, the light bars 651, 658 may be optimally mounted as far away as each other as possible, within practical constraints. For example, the light bars 651, 658 may be arranged with one close to the ceiling of the trailer and with one close to the floor of the trailer. FIG. 6 shows the bottom light bar 658 mounted close to the floor of the trailer and on the front surface of a base of the robot. The top light bar 651 is illustratively placed close to the ceiling 656 of the trailer near the end effector 6510 of the robot, which may be embodied as an end-of-arm tool.

In such embodiments, the placement of the top light bar 651 can be constrained by the requirement that it does not interfere with the primary function of the end-of-arm tool which is to pick the cartons securely for placement onto conveyors or other transport. With the top and bottom locations of the light bars 651, 658, the intensity of the lighting on the carton wall can depend on the distance between the carton wall and the light bars 651, 658, and can depend on the lenses of each light of each light bar (e.g., FIG. 2, lenses 214, 216). The lens of the light source can determine the spread of the light from the light source. The light bars 651, 658 and/or lenses can be oriented to direct their light towards the horizontal plane at the camera axis.

In the illustrative embodiment, each light bar 651, 658 includes two sets of LED's strips, one with 120 degree lens and the other with 30 degree lens, which are combined into a single light source so that they can illuminate different sections of the carton wall efficiently. The 120 degree lens LEDs of each light bar 651, 658 are illustratively pointed nominally perpendicular to the carton wall so that their highest intensity on the carton wall is close to the section of the wall near the light bar 651, 658. The 30 degree LEDs of each light bar 651, 658 are illustratively pointed so that their highest intensity on the carton wall is closer to the opposite end (far end) of the carton wall (for example, at 60 degrees from horizontal, as shown in FIG. 10). The use of two distinct angles of illumination can provide a more complete spread of light for each light source 651, 658 for image capture. Captured images can be processed to determine the characteristics of the light intensity.

Image processing can performed by summing the images from a set of images generated using the spaced apart (opposing) light sources, e.g., light bars 651, 658. The gradient of the images can be obtained by convolution with a kernel. A directional gradient is obtained by using a kernel designed to detect gradients in one direction, such as indicated by the x- and y-Sobel gradients below:

$G_x$

| -1 | 0 | +1 |
|----|---|----|
| -2 | 0 | +2 |
| -1 | 0 | +1 |

$G_y$

| +1 | +2 | +1 |
|----|----|----|
| 0  | 0  | 0  |
| -1 | -2 | -1 |

Once the Shading Topography (ST) image is computed, the ST image may contain noise, for example, caused by deformations on the face of the cartons, manufactured holes, tears and/or shadows due to depth variation of the cartons in addition to the desired signal from the interface between cartons. An algorithm can be applied to find straight line segments within the ST image data. For example, the Hough transform can be applied to detect the valid boundaries between the adjacent cartons. The algorithm can be used with a scoring metric (e.g., a count of discernable lines found within a predefined window area within the image) such that the long continuous edges between cartons receive higher weighting than the noise created by other features.

The ST image can show an extended region of signal where an interface between the cartons is present. This can be advantageous because it can make the interface easier to detect. The precise location of the interface within this region can be found by computing the midpoint of the shading region.

Inside a trailer in a warehouse, the background ambient light at 850 nm can be considered quiet low. However, some trailers may contain portholes that can increase the intensity of background light significantly. A separate image can be acquired with all the lights of the vision system turned off to detect the presence of any background ambient light. This image can be also used to detect the presence of a Lidar at 850 nm used to position the robot. These signals can be subtracted from the images used for STI.

The construction of a trailer itself can affect the lighting on cartons. For example, the ceiling can pose a particular challenge if it has a bare metal surface. Trailers with a wooden ceiling may not adversely affect the lighting of the carton wall. However, a metal ceiling can reflect light at unexpected angles which can cause shadings in the images that can be mistaken for carton interfaces. To overcome this obstacle, the LED lights can be designed with two different sets of lenses: one lens as a wide 120 degree angle, and the other lens as a narrow 30 degree angle. Images can be acquired using both these lenses such that features which differ between the two lighting geometries can be used to remove the artifacts caused by the ceiling.

By way of example, images acquired with a top light and a bottom light are shown in FIGS. 11 and 12. In FIG. 11, the left hand image illustratively shows an image of a carton wall illuminated with the top light bar 651 using only the 30 degree lens and corresponding LED strip, while the left hand image in FIG. 12 shows an image captured of the same carton wall illuminated with the top light bar 651 using only the 120 degree lens and corresponding LED strip. In FIG. 11, the right hand image illustratively shows an image captured of the same carton wall illuminated with the bottom light bar 658 using only the 30 degree lens of the corresponding LED strip, while the right hand image in FIG. 12 shows an image captured of the same carton wall illuminated with the bottom light bar 658 using only the 120 degree lens and corresponding LED strip.

Referring to FIGS. 13 and 14, the left hand images (FIGS. 13A & 14A) shows the computed shading topography images using the combined information from each of the images in each of FIGS. 11 and 12. The STI technique can provide an accurate location of the horizontal and/or vertical positions of the carton interfaces. The STI image data can be combined with binocular stereo image data (FIGS. 13B and 14B) to produce three dimensional location information (e.g., pick coordinates) in the camera's coordinate space. For example, for a carton wall region defined by the valid carton interfaces found using the STI data, the binocular stereo depth image data can be queried to determine the depth of the interfaces. Suitable examples of binocular stereo devices, systems, and methods may be found within U.S. Pat. No. 5,383,013, filed on Sep. 18, 1992, and U.S. Pat. No. 7,444,013, filed on Aug. 10, 2001, the contents of each of which are hereby incorporated by reference, in their entireties, including but without limitation, those portions directed to stereo image analysis.

Binocular stereo approaches may use image correspondence between images from multiple cameras that are separated by a known distance to produce a depth map of the carton wall. For example, each of two cameras may use a wide-angle lens that causes a significant distortion of their image. The process of correcting the image for this distortion may be included in the calibration of the system. Calibration of each camera and its wide-angle lens may be preferably performed at the factory, and/or prior to installation of the cameras for use. Calibration of each camera and lens may not require a wall of cartons or the robot itself. In some embodiments, camera and lens calibration for binocular stereo techniques may be performed for at least two (e.g., a pair) cameras and lenses in their enclosure while installed on the robot. The binocular stereo calibration process may use a checker board pattern presented at multiple angles and locations over the entire field of view of the image for each camera, and over 400 images may be acquired to produce accurate calibration.

Binocular stereo calibration can ensure that the coordinates derived from images are accurate when translated into the coordinate space of the binocular stereo vision system. An alignment procedure can be required to translate these coordinates into the robot coordinate space. The alignment procedure may be required each time the camera enclosure containing the at least two cameras are installed on a robot. The alignment procedure can provide the rotation and translation matrices required to accurately translate the vision system coordinate space into the robots pick coordinates. Initial calibration as part of STI can be required for any camera with a lens distortion. As previously mentioned, the binocular stereo calibration can be performed offline at a factory prior to installation of the camera.

Yet, Photometric Stereo approaches can require calibration of the cameras together with the light sources and/or with the actual background light of the environment to be navigated. For example, Photometric Stereo calibration can be required to model the variation of the greyscale intensity at many locations in the image due to the angle and/or intensity of each light. This variation in grayscale intensity values can require in-situ calibration on the robot and/or within the trailer environment to account for variations in environmental light, such as from multiple reflections of the trailer walls, ceiling, and/or floors and their respective geometries. The Photometric Stereo (PS) model can then be used to differentiate between reflectance changes and surface shape (surface normal) changes when imaging an unknown object.

In contrast to Photometric Stereo techniques which require extensive calibration between cameras and lights, STI does not depend on the calibration of the vision system. Rather STI can model variation of the pixel intensity due to lighting intensity and/or orientation and/or distance during operation, in lieu of a separate, in-situ calibration processing. This can be a significant advantage, for example, in industrial applications.

In some embodiments, the shading topography image may comprise a convolutional shading topography image developed by a convolutional neural network. As discussed in additional detail herein, image sets can be inputted to the convolutional neural network to train the neural network. The image sets may be inputted according to multiple channels such as 3-channels as common red, green, blue visual channels. In the illustrative embodiment, the three channel stacks for image sets can include [binocular stereo], [top light angle 1, bottom light angle 2], [top light angle 2, bottom light angle 1]. The channel stacks for [top light angle 1, bottom light angle 2], [top light angle 2, bottom light angle 1] may be formed as the pixel difference between top light angle 1 and bottom light angle 2, and the pixel difference between top light angle 2 and bottom light angle 1. In some embodiments, greater or fewer than 3-channels may be applied, and/or other channel stacks. In some embodiments, the channels and/or channel stacks may be determined by threshold evaluation of performance for a predetermined set of images for specific environmental conditions, for example, by least error compared with a ground truth set of results with the fastest interference speed.

Referring to FIG. 8, an alignment procedure for STI techniques can allow a maintenance technician to install a new vision system on a robot with ease. The procedure may use a Lidar system having two scanning Lidar sensors 871a, 871b that can provide accurate depth measurements, for example, +/−about 0.04 inches (1 mm) for a range of about 78 inches (2 m). The Lidar sensors 871a, 871b are illustratively mounted on the end-of-arm tool of the robot as suggested in FIG. 8. The precise location of the Lidar sensors 871a, 871b with respect to the end effector 8710 of the robot may be known from design and/or can be confirmed by measurement. Custom alignment targets 876, 879 are illustratively positioned in at least nine positions over the carton wall.

The targets 876, 879 are illustratively embodied as being formed as a thin sheet of plastic having a flange for insertion between cartons of the carton wall such that a front surface of the target faces the robot. The front surface of the targets are embodied as about 6 inches (150 mm) tall and protrude from the carton wall by about 1 inch (25 mm) or more. The targets (7.6, 7.9) illustratively a graphic, such as fiducial pattern, that can be detected by the STI vision system. The fiducial pattern can be formed to include a cross-hair, a checker board pattern, and/or a bullseye. For example, a fiducial pattern including a checker board pattern may allow precise detection of tilt and/or position of the target by the vision system. One suitable example of fiducial pattern recognition which may be applied in the present disclosure is disclosed within U.S. Pat. No. 7,039,229, issued on May 2, 2006, the contents of which are incorporated by reference herein, including but without limitation, those portions related to pattern recognition.

During the alignment process the technician may use a special mode of the robot to direct the robot to a specific set of locations in which the Lidar sensors 871a, 871b mounted on the end-of-arm tools are arranged within about 2 inches (50 mm) of an alignment target 876, 879. With this arrangement, the robot (e.g., via its control system, such as a programmable logic controller) may send a signal to the vision system to initiate recording of the Lidar data. Once this Lidar data has been recorded, the vision system may initiate the robot to proceed to the next target 876, 879 location. After target data from each target 876, 879 has been recorded, the robot can be directed to an imaging position to allow the cameras to acquire images of the carton wall with all of the targets 876, 879.

The vision system may detect the targets 876, 879 in the captured images and the position of the fiducial patterns on the targets 876, 879. Target and/or fiducial pattern detection may be performed by a processor executing software and/or firmware stored on memory, such as a dedicated memory device. The vision system may use the Lidar data acquired at each robot position to detect the position of each target 876, 879. Each target 876, 879 can be detected with signal processing of the Lidar data. The spacing of about 1 inch (25 mm) between each target 876, 879 from the carton wall can produce a clear step in the Lidar signal that can be used to automatically detect the location of each target 876, 879 within the Lidar data. The distance between the Lidar sensors 871a, 871b and each target 876, 879 can be recorded for that Lidar signal. The edges of the step in the Lidar signal for each target 876, 879 can be used to determine the distance between the target, the ceiling, and/or the floor using the vertically oriented Lidar sensor 871b. Using the horizontally oriented Lidar 871a, the distance between the side walls 877 of the trailer and the edges of each target 876, 879 can be determined. Since the coordinates of the positions to which the robot was directed for assessing each target 876, 879, and/or the offsets from each target 876, 879 have been measured (e.g., spacing from sidewalls, ceiling, and/or floor), a regression method can be used to determine the three-dimensional rotation and/or translation matrix in order to translate the vision system coordinates into robot coordinates.

As shown in FIG. 9, the location of an alignment target 986 in an image relative to a wall 988 of the trailer, defines a distance 982. The location of the target 986 relative to the floor 987 of the trailer defines a distance 981. The distances 981, 982 can determine the horizontal and vertical location of the target 986 in the vision system coordinate space. The binocular stereo image can be used to determine the depth of the target 986. The distances 981, 982 together with the depth information of the binocular stereo image can be used to define the coordinates of the target 986 in the vision system coordinate space.

Referring still to FIG. 9, the vertical lidar scanner is shown as 987 and the location of a target according to the vertical lidar scanner 987 is shown as 983. The vertical location 983 of the target can be automatically detected using common signal processing techniques to detect step changes within a one dimensional signal to define the vertical position of the target in the robot coordinate space. The horizontal lidar scanner 989 can determine the horizontal location of the target as 984. The horizontal location 984 can be automatically detected using common signal processing techniques to detect step changes within a one dimensional signal, to define the horizontal coordinate of the target in the robot coordinate space. The depth of the target can be measured directly by both the horizontal and vertical lidar scanners 987, 989 in the regions of the step change 986, 985. These direct measurements can be compared with each other. If the direct measurements are consistent with each other, the direct measurements can be averaged to determine the depth of the target in the robot coordinate space. A regression between the vision coordinate space values and the robot coordinate space values can be calculated to determine the learned alignment of the combined system of the collective robot-vision system. The learned alignment can be used to transform the measured vision coordinate values to robot coordinate space values.

Referring now to FIG. 17, a diagrammatic view of the robotic assembly 110 is shown. The robotic assembly 110 includes vision system 126 and robotic system 130. The robotic system 130 includes robotic structures 132 (e.g., appendages, supports, wheels, etc.), robotic actuator/operator devices 134 for robotic structure operations (e.g., sensors, motors, pumps, lubricant/coolant/hydraulic fluid storage, electrical power storage, and related auxiliaries), and may optionally include one or more control systems 136 (e.g., processors, memory, and communications circuitries) for conducting robotic structure and/or actuator/operator operations, although in some embodiments, processors, memory, and/or communications circuitry may be partly or wholly shared with the vision system 126.

The vision system 126 includes a control system 140 for governing vision system operations. The control system 140 includes processor 142, memory 144 storing instructions for execution by the processor 142, and communications circuitry 146 for communicating signals to and/or from the processor 142. The vision system 126 includes cameras 148 and light sources 150 in communication with the control system 140 for operation as discussed herein. Examples of suitable processors may include one or more microprocessors, integrated circuits, system-on-a-chips (SoC), among others. Examples of suitable memory, may include one or more primary storage and/or non-primary storage (e.g., secondary, tertiary, etc. storage); permanent, semi-permanent, and/or temporary storage; and/or memory storage devices including but not limited to hard drives (e.g., magnetic, solid state), optical discs (e.g., CD-ROM, DVD-ROM), RAM (e.g., DRAM, SRAM, DRDRAM), ROM (e.g., PROM, EPROM, EEPROM, Flash EEPROM), volatile, and/or non-volatile memory; among others. Communication circuitry includes components for facilitating processor operations, for example, suitable components may include transmitters, receivers, modulators, demodulator, filters, modems, analog to digital converters, operational amplifiers, and/or integrated circuits.

The robotic assembly 110 is illustratively embodied to include a neural network 160 as a portion of the vision system 126. The neural network 160 is illustratively embodied as a deep neural network, and more specifically as a convolutional neural network for developing and executing convolution of images to provide a shading topography image as a convolutional shading topography image as a composite of information of the images. Although, in the illustrative embodiment, the neural network 160 is shown as a portion of the vision system 126 distinct from the controller 142, memory 144, and 146, in some embodiments, the neural network 160 may be formed with components partly or wholly shared with other components of the vision system 126, other features of the robotic assembly 160 (e.g., robotic system 130, cameras 148, light sources 150), and/or as partly or wholly remote from and in communication with the robotic assembly 110.

In the illustrative embodiment, the neural network 160 is trained according to various image sets obtained by the vision system 126 of the robotic assembly 110. Training the neural network 160 for use in handling cargo can comprise input and analysis of image sets from tens, hundreds, or thousands (or more) of cargo walls, and may be updated with additional images sets even after field implementation. Training the neural network 160 can comprise feedback in which the outputs of the neural network 160 are compared with threshold values, and pass/fails ratings are returned to the neural network 160 for consideration (learning). In some embodiments, correction information containing the expected output values may be returned to the neural network. Threshold value comparison may include computer comparison, manual (human) comparison, and/or combinations thereof. For example, a training convolutional shading topography image can be developed by the neural network 160 based on the inputted training image set(s) and the training convolutional shading topography image can applied to develop training pick coordinates. The training pick coordinates can then be compared with actual pick coordinates of the cartons in the training images and threshold values can be applied to determine whether the training pick coordinates are within acceptable range of the actual pick coordinates. The neural network 160 can be deemed to be a trained neural network 160 by achieving threshold accuracy in providing pick coordinates over a threshold number of groups of images sample sets. Threshold accuracy in pick coordinates for individual training image sets and/or groups of images sample sets may be application specific, and may vary based on environmental conditions including expected cargo variability (size, material, color, position, etc.). In some embodiments, trained neural network 160 may include neural networks which originate from proprietary configurations (e.g., pre-configured neural networks), which are thereafter further trained according to application specific training sets.

Trained neural network 160 can be deployed for use with robotic assembly 110 to handle cargo. Active (non-training) images sets can be provided from the vision system 126 to develop the convolutional shading topography image by the trained neural network 160. Actual pick coordinates (non-training) can be determined based on the convolutional shading topography image. In the illustrative embodiment, the neural network 160 determines the pick coordinates from the convolutional shading topography image, partly or wholly by the neural network 160 itself, and/or in conjunction with other systems apart from the robotic assembly 110. The convolutional shading topography image is illustratively formed partly on the basis of the channel stack including the binocular stereo image data, within one or more filter layers of the neural network 160. The filter layers may be embodied as convolutional kernels, which may each comprise a predetermined matrix of integers for use on a subset of input pixel values of the capture images. The kernels may be selected by the convolutional neural network itself. In some embodiments, the convolutional shading topography image may be formed in one or more filter layers independent from the binocular stereo image data, and may be combined with the binocular stereo image data in another one or more filter layers of the neural network 160. Determined pick coordinates can be communicate with the robotic assembly 110 for use in handling the cargo. In some embodiments, the neural network 160 provides the convolutional shading topography image to the robotic assembly 110 to determine the pick coordinates. In some embodiments, the convolutional shading topography image may be derived from the neural network processing of multiple image channels which each comprise a predetermined composite stack of information of a plurality of images captured by the at least one camera.

Within the devices, systems, and methods of the present disclosure, at least two cameras of the vision system can determine the vision coordinate space. Other elements of the vision system can be replaced and/or installed without affecting the alignment of the camera pair, and thus, the aligned coordinate space. Exemplary instances which may require alignment include (1) after initial installation; (2) after removal and/or re-installation of the camera enclosure, for example, for robot maintenance; (3) under replacement of a camera and/or the camera enclosure; and/or (4) as a periodic check to account for drift and/or accidental movement, for example, due to collision and/or shock.

Devices, systems, and method of the present disclosure may be adapted to consider shading and/or shadows caused by depth variation. For example, when cartons of a carton wall are not at the same depth as each other (viewed from the front), shading may be created, for example, as a shadow from one of the cartons being cast on another carton. The shadow characteristics can depend on the position of one or more of the cartons (casting or receiving) relative to the light sources. FIG. 15 shows a depiction in which adjacent cartons (A, B) vary in the depth of their face ($A_1$, $B_1$) along the z axis (vertical in FIG. 14). The carton B is illustratively arranged closer to the light source 151 along the x-axis and is also closer to the camera along the z axis. From the light source 151, carton B casts a shadow onto the carton A, and the region of shading at the interface between the cartons (A, B) is larger than expected than if there were no depth variation (i.e., if the faces $A_1$, $B_1$ were each arranged at the same position along the z axis). The shadow can be analyzed similar to the STI signal and used to detect the interface of the cartons (A, B).

FIG. 16 shows the carton B that closer to the light along the x axis and is further from the light along the z-axis compared to carton A. The drop in the image intensity at the edge of the cartons (A, B) is followed by an increase in the reflection from the side wall of the carton next to it, such that there is no shadow from depth variation in this case. Accordingly, the arrangement of the cartons (A, B) can be determined.

Illustrative embodiments have included disclosure concerning trailers having structure which imposes little or no impact on the imaging. However, devices, systems, and methods within the present disclosure may be adapted to accommodate variation of imaging due to trailer type and carton wall position within trailer. For example, trailer types may include SEV 98" wide+4/−0" and 126" tall+0/−2" and SF 102" wide, +0/−2" and 110" tall+1/−2". The trailer type can affect the size of the wall of cartons within the trailer, for example, when fully loaded. In one suitable example, the carton wall may be positioned into the body of trailer by a distance of about 64 inches (1625 mm) from the base of the robot (J1).

The transition from a loading dock to the trailer can be affected by the relative height of the trailer compared with the loading dock. For example, the floor of some trailers can be lower or higher than the floor of the loading dock. Dock levelers can be used to transition from between docks and trailers having floors of different heights. For example, a dock lever may include a ramp between the floors of the loading dock and the trailer. While the robot, or a portion of the robot is position on the dock leveler, cameras and/or light source mounted to the robot may be arranged with tilt because the robot is not on level support, for example, the cameras and/or light sources may be tilted with respect to the wall of cartons within the trailer. By way of example, dock levelers may create angles with respect to entry of the trailer within the range of about −5 to about 5 degrees, although in some instances, lesser or greater angles may also be created.

Such tilt can cause a systematic depth variation that can affect the lighting profile over the carton wall. The STI approach may be optimized to account for this systematic depth variation. Due to the tilt of the camera, the cartons may appear in a lower (or higher) portion of the image than when the robot is positioned within the body of the trailer. This lower (or higher) portion of the camera image can have lesser resolution than the center of the image for well-known lens geometry reasons. The ST algorithm may need to be optimized in order to obtain the required robot picking accuracy for this region. In addition, since the camera is centrally located, the tilt of the robot can increase the occlusion of one carton by another carton above or below it. This occlusion can cause the size of the carton to appear to be smaller which needs to be accommodated by the logic that determines the final carton locations. The overall tilt of the carton wall must also be factored into the transformation of the carton locations in the vision system coordinate to the robot coordinate. The distance from the camera(s) to the carton wall may be about 72 inches (1825 mm) when the robot is at least partly on dock leveler (this includes additional distance beyond the 64 inches mentioned above, as the angle imposed by the dock leveler can alter the field of view). The position of the robot being partly or wholly on the dock leveler can be determined based on the robot distance relative to the trailer, robot sensor data (e.g., angular sensor), and/or the detection of the perceived tilt of the carton wall relative to the robot. Distance into the trailer may be determined based on a combined length of extendable, string encoder, and/or fixed vehicle length.

Carton stacking variations, and/or movements of the cartons within the trailer, for example, during transports, and/or other factors can cause the depth of the face of cartons of a carton wall to vary, for example, within a range of +/−20 inches (500 mm) from the average depth of a carton wall. If the depth of a carton is detected to be larger than this allowed variation, the carton may be determined to be part of a carton wall that is positioned behind the current carton wall that is being picked. A complete carton wall can have cartons from floor to ceiling, and can have cartons from side wall to side wall. A carton wall is complete if no more than one carton is missing from the top of any column. A depth image can be used to detect partial carton walls, e.g., carton walls which are missing more than one carton, for example, from the top of one of the columns of the carton wall. The information about the type of wall can be communicated to the robot.

The present disclosure includes step and/or backwall detection. Some trailers may have a step within their body, closer to the front of the trailer (away from the rear gate). This step may need to be detected by the vision system to avoid inappropriate treatment by the robot. STI can be used to detect the step by inspecting for an absence of edges that are found between cartons. The distance within the trailer (e.g., distance from the rear gate) at which a step would be expected is generally known according to the trailer size (length), and the known distance that the robot travels into the trailer (e.g., distance travelled from the rear gate) can be considered in comparison to the expected distance generally known for the step, to assist the vision system in detecting the presence of a step. Similarly, detection of the backwall of the trailer can be performed based on the distance traveled into the trailer and/or the lack of STI edges on the back wall.

Notably, trailers can have structural ribs formed on their ceilings, and these ceiling ribs can affect the geometry of the lighting, for example, by causing multiple reflections of the light, which can cause shadow artifacts on the surface of the wall of cartons. The two lights of the light sources with different lighting angles at each top and bottom locations can reflect differently from the ceiling ribs. Comparing images captured under the different light sources can allow for the detection of the presence of ribs that can then be used to identify the light source that minimizes the effect on the ST imaging.

Once carton edges in the ST image are analyzed and the most likely candidates are identified as carton interfaces, the distance between the identified edges can be used to determine carton size at each location in a carton wall. If the carton sizes are limited to known sizes that occur in the supply chain in a business, then the sizes of the cartons at each location can be checked against this list of possibilities. If the measured carton is close to a known size, then the location of the interface can be updated depending on a confidence score of the identified edge. If the confidence score is relatively high and the carton is measured to be smaller than expected from the known carton size, then the identified edge may not modified. For example, cartons can be damaged and/or appear to be smaller when they wear out, such that a high confidence score can assist in determining whether to disregard unexpected information differences.

In other instances, the identified edge may updated, for example, the location of the identified edge may be corrected according to the known sizes of cartons. The distances between the edges can used to re-compute the carton sizes. This process can be iteratively repeated until the difference between measured and expected carton sizes is within an acceptable error range, for example, about +/−0.25 inches (10 mm). In some embodiments, the acceptable error can be determined according to an offset that the robot can tolerate before it misses a pick on a carton, for example, about +/−7 inches.

This approach can use business information to logically constrain the location of the observed cartons, according to known parameters, such as known carton dimensions. This business logic approach can be used during the identification of the STI edges by restricting the edge identification approach to locations where a carton interface is expected. Business logic can be used to correct misidentification of a split or crack in a partly opened carton, as a false edge, for example, by disregarding the false edge. Business logic can be used to correct the misidentification of an elongated carton (merged carton) by introducing an edge where one was not found by image interpretation. Correction of misidentification of an elongated carton can include a more aggressive search for edges in the region in which the expected edge was not identified in the STI, for example, by affording more weight to light intensity changes in the region in which the expected edge was not identified but would have been expected according to known carton dimensions.

As shown in FIG. 7, a process may include positioning the robot, acquiring one or more images, and determining coordinates. The robot may be arranged in position by approaching a carton wall to obtain an imaging position. The robot may verify its positioning by any suitable method, for example, measuring distance to known reference elements. Upon desirable positioning, the process may proceed to image capture (acquisition). During image capture the cameras may capture various images. The various images may include applying only a top light source and capturing one or more images with each of the two cameras. The various images may include applying only a bottom light source and capturing one or more images which each of the two cameras. An STI image may be computed and a depth image may be captured and/or computed. Case coordinate data may be determined based on a combination of the STI image and depth image. The process may proceed to compute pick coordinates.

Based on the case coordinate data, a determination may be made as to a stack type. SKU transitions, indicating the sizes of cases or carton, made be determined within the case coordinate data. If SKU transitions cannot be determined, a determination of incorrect SKU may be determined and a correction to the SKU may be applied and/or the SKU may be removed from consideration. If determined SKU transitions indicate correspondence with known sizes of cases or carton, the determined SKU transitions may be output for robot operation in picking.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

We claim:

1. A robotic assembly for handling cargo, the assembly comprising:
   at least one robotic appendage for handling cargo; and
   a vision system for acquiring information to assist operation of the at least one robotic appendage, the vision system comprising:
   at least two light sources arranged spaced apart from each other by a distance;
   at least one camera configured to capture images of cargo for handling by the robotic assembly; and
   a vision control system for determining position of cargo, the vision control system including at least one processor for executing instructions stored on a memory to determine position of cargo based on a shading topography image comprising a blended composite of information of a plurality of images captured by the at least one camera.

2. The robotic assembly of claim 1, wherein the shading topography image comprises a convolutional shading topography image comprising a convolution of the plurality of images captured by the at least one camera.

3. The robotic assembly of claim 2, wherein the convolutional shading topography image is generated by a neural network.

4. The robotic assembly of claim 2, wherein the convolution of the plurality of images comprises convolution of predefined channels of images captured by the at least one camera.

5. The robotic assembly of claim 4, wherein one of the predefined channels comprises image data captured under illumination by at least one, but fewer than all, of the at least two light sources, and other image data captured with illumination by at least another one, but fewer than all, of the at least two light sources.

6. The robotic assembly of claim 5, wherein the image data captured under illumination by at least one, but fewer than all, of the at least two light sources comprises image data captured under illumination by one of the at least two light sources having a first upper directional lighting trajectory and the other image data captured with illumination by at least another one, but fewer than all, of the at least two light sources comprises image data captured under illumination by another one of the at least two light sources having a first lower directional light trajectory.

7. The robotic assembly of claim 6, wherein another one of the predefined channels comprises image data captured under illumination by at least one, but fewer than all, of the at least two light sources having a second upper directional light trajectory, different from the first upper directional light trajectory, and other image data captured with illumination by at least another one, but fewer than all, of the at least two light sources having a second lower directional light trajectory, different from the first lower directional light trajectory.

8. The robotic assembly of claim 4, wherein at least one of the predefined channels comprises image data captured with illumination by greater than one of the at least two light sources.

9. The robotic assembly of claim 4, wherein the image data captured with illumination by greater than one of the at least two light sources includes image data captured under illumination by first and second directional light trajectories for each of the at least two light sources.

10. The robotic assembly of claim 1, wherein the at least one camera is arranged between two of the at least two light sources.

11. The robotic assembly of claim 10, wherein the at least one camera is configured to capture at least one image of cargo under illumination by at least one of the at least two light sources and at least another image of cargo under illumination by another one of the at least two light sources.

12. The robotic assembly of claim 11, wherein configuration of the at least one camera to capture the at least one image includes configuration to capture the at least one image under illumination by at least one of the at least two light sources without illumination by another of the at least two light sources, and configuration of the at least one camera to capture the at least another image includes configuration to capture the at least one another image under illumination by at least the another of the at least two light sources without illumination by at least one of the at least one of the at least two light sources.

13. The robotic assembly of claim 1, wherein the at least one camera is coupled with a robotic unloading machine comprising the at least one robotic appendage.

14. The robotic assembly of claim 13, wherein at least one of the at least two light sources is coupled with the robotic unloading machine.

15. The robotic assembly of claim 1, wherein at least one of the at least two light sources includes a first light having a first directional lighting trajectory and a second light having a second light trajectory.

16. The robotic assembly of claim 1, wherein the vision control system is adapted to conduct an imaging sequence including communicating with the at least one camera to capture one or more images of a wall of cargo under a predetermined illumination scheme of the at least two light sources.

17. The robotic assembly of claim 16, wherein the predetermined illumination scheme includes one or more images having none of the at least two light sources illuminated, one or more images having all of the at least two light sources illuminated, and one or more images having fewer than all of the at least two light sources illuminated.

18. The robotic assembly of claim 17, wherein the one or more images having fewer than all of the at least two light sources illuminated includes at least one image under illumination by only a first light of one of the at least two light sources having a first directional lighting trajectory.

19. The robotic assembly of claim 18, wherein the one or more images having fewer than all of the at least two light sources illuminated includes at least one image under illumination by only a second light of the one of the at least two light sources having a second directional lighting trajectory, different from the first directional lighting trajectory.

20. The robotic assembly of claim 1, wherein the shading topography image comprises an expression of absolute value of a gradient sum of intensity values of a number of images of cargo acquired by the at least one camera.

21. A vision system of a robotic assembly for handling cargo, the vision system comprising:
at least two of light sources arranged spaced apart from each other by a distance;
at least one camera configured to capture images of cargo for handling by the robotic assembly; and
a vision control system for determining position of cargo, the vision control system including at least one processor for executing instructions stored on a memory to determine position of cargo based on a shading topography image comprising a blended composite of information of a plurality of images captured by the at least one camera.

* * * * *